Dec. 25, 1956 H. H. BACH ET AL 2,775,438
METHOD AND APPARATUS FOR PROCESSING BALLAST
Filed Sept. 6, 1951 19 Sheets-Sheet 1

INVENTORS:
Harold H. Bach &
Charles L. Towle
BY
ATTORNEYS.

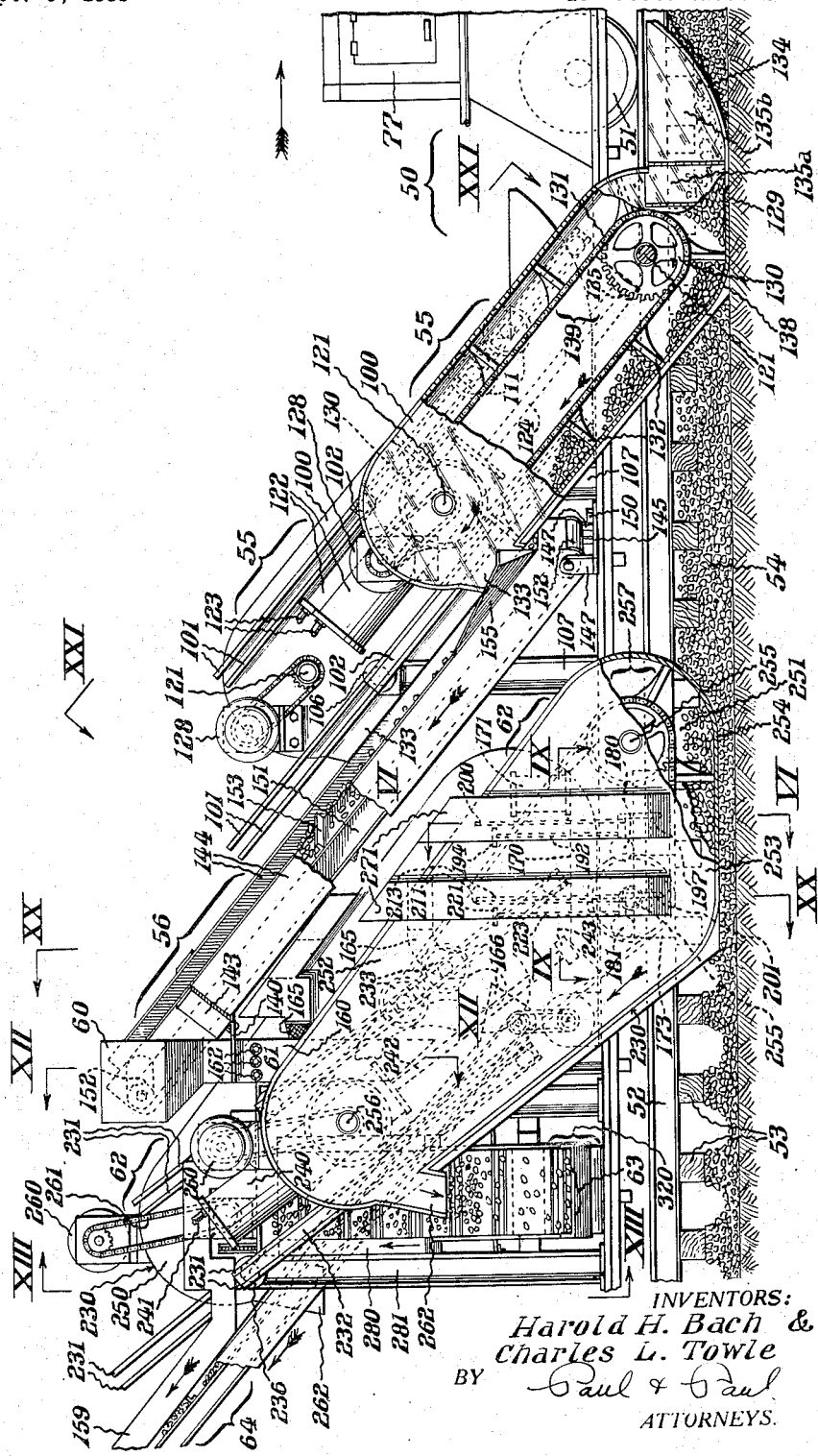

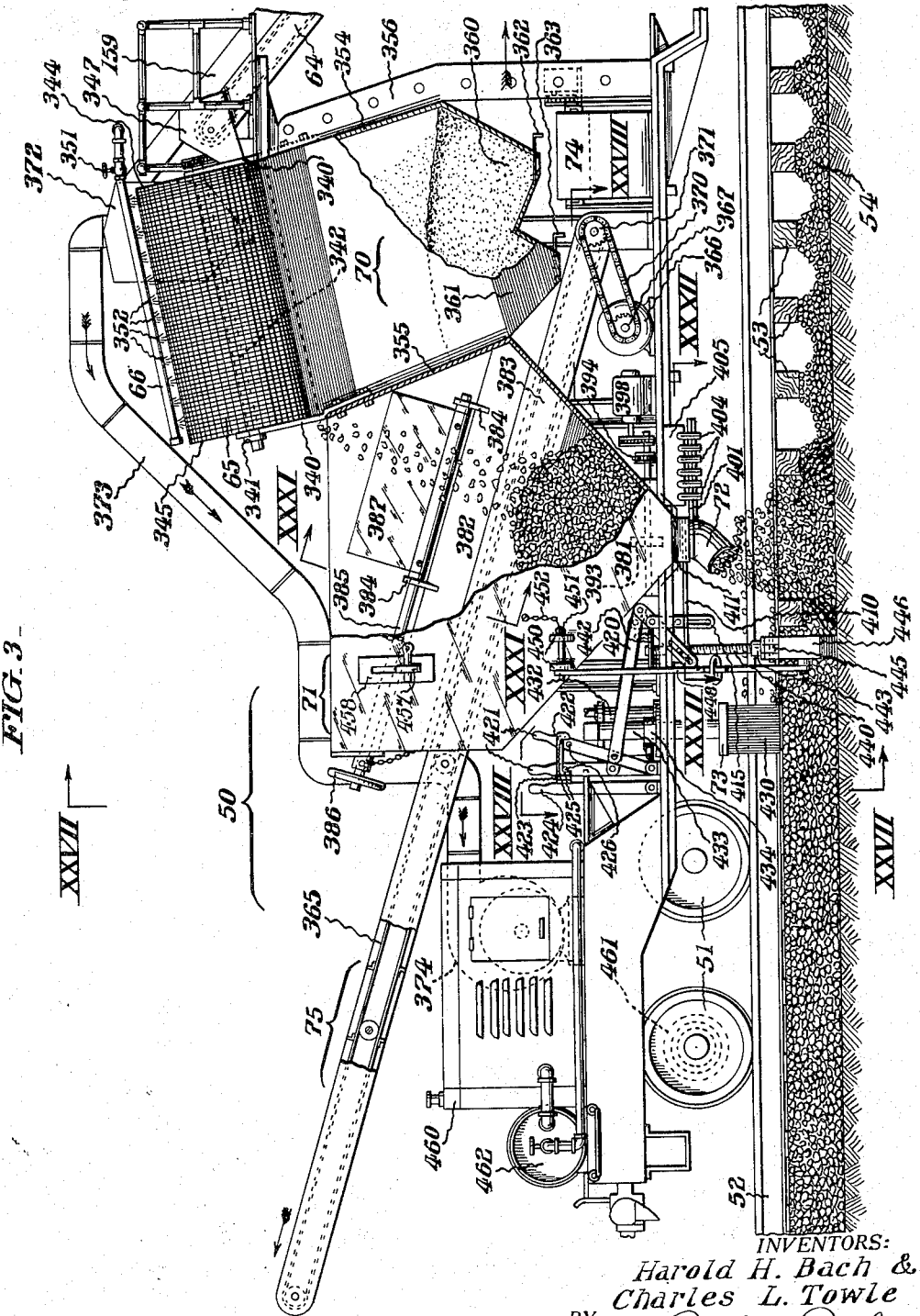

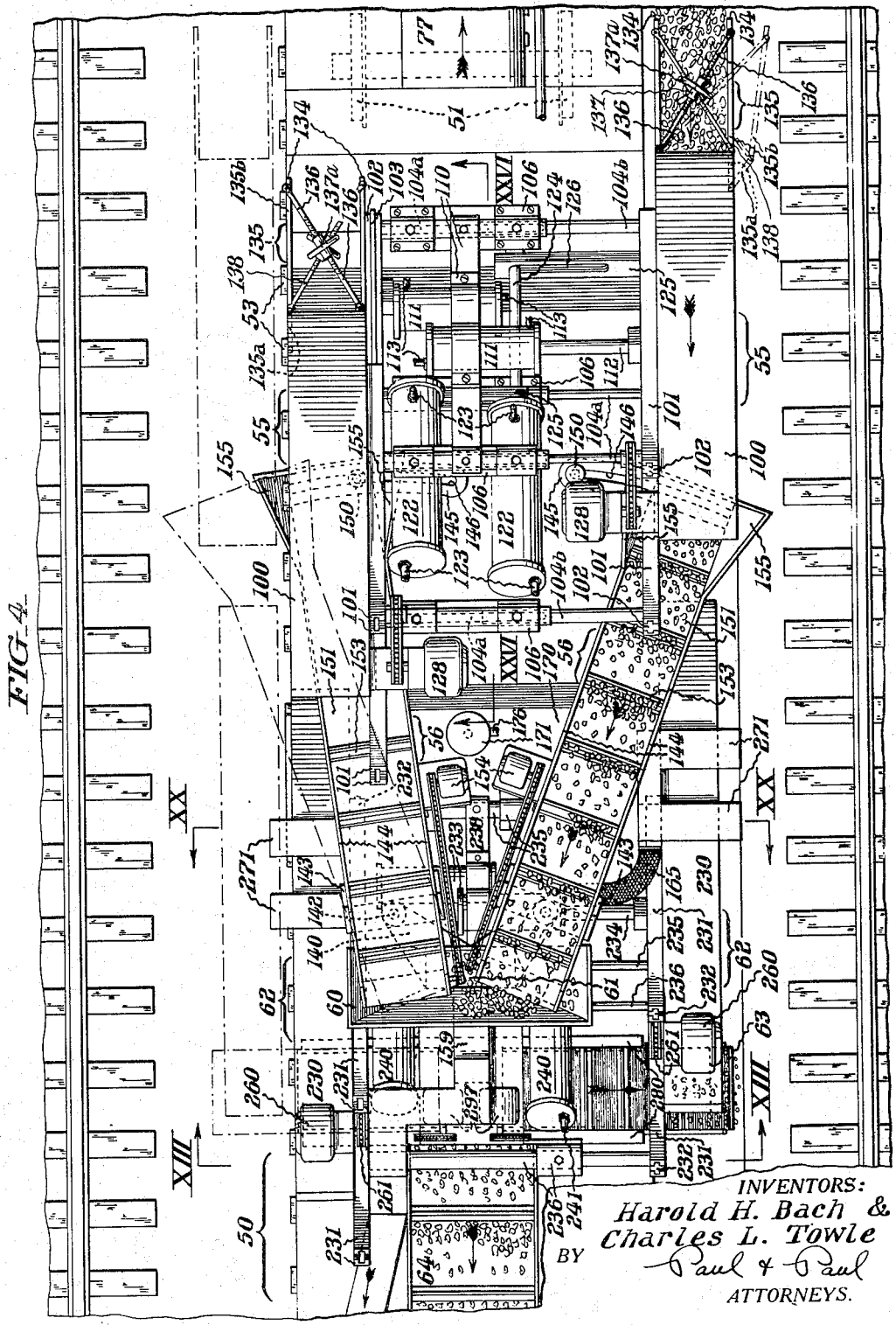

Dec. 25, 1956     H. H. BACH ET AL     2,775,438
METHOD AND APPARATUS FOR PROCESSING BALLAST
Filed Sept. 6, 1951     19 Sheets-Sheet 5
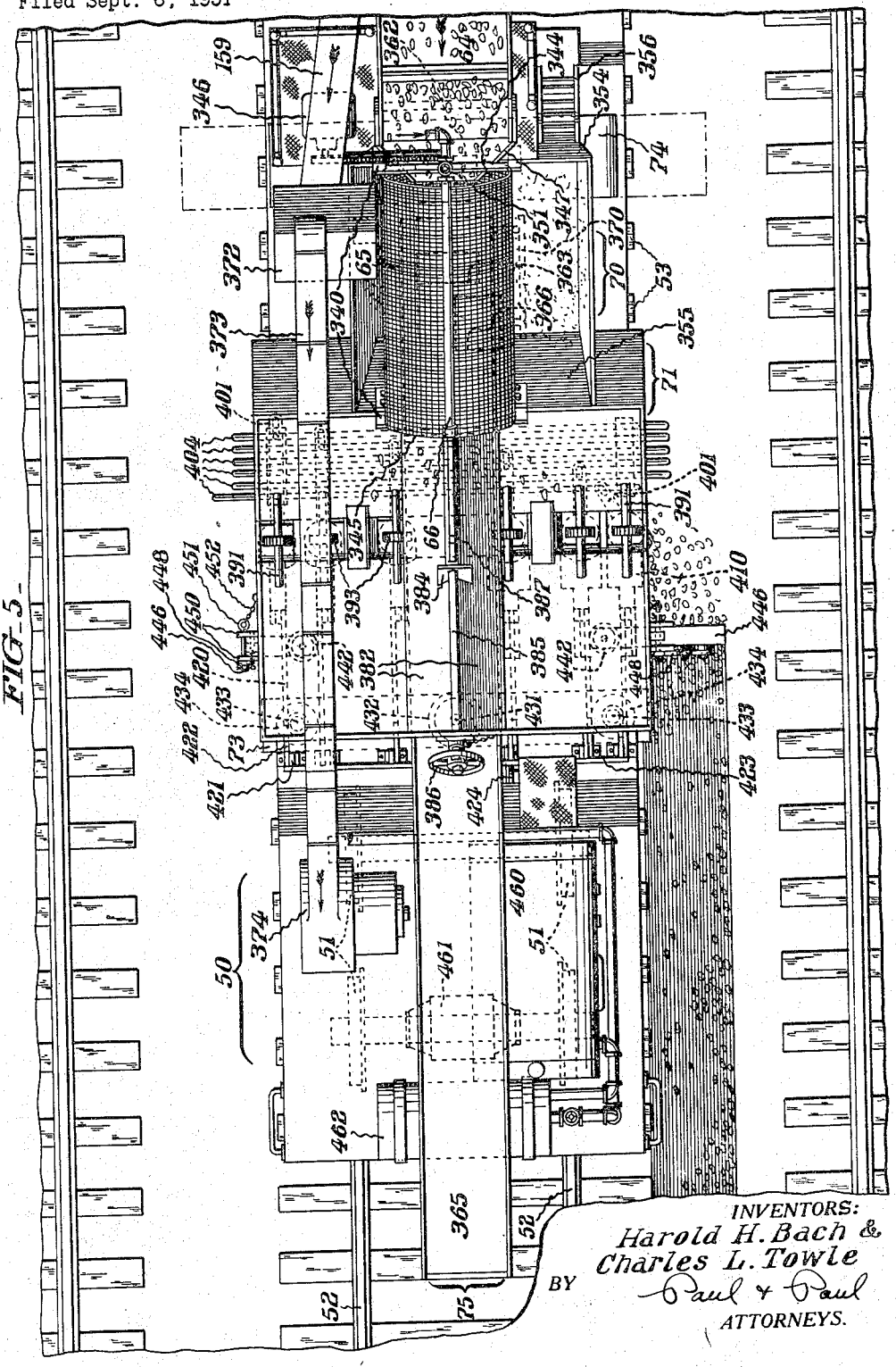
INVENTORS:
Harold H. Bach &
Charles L. Towle
BY Paul & Paul
ATTORNEYS.

Dec. 25, 1956 H. H. BACH ET AL 2,775,438
METHOD AND APPARATUS FOR PROCESSING BALLAST
Filed Sept. 6, 1951 19 Sheets-Sheet 6
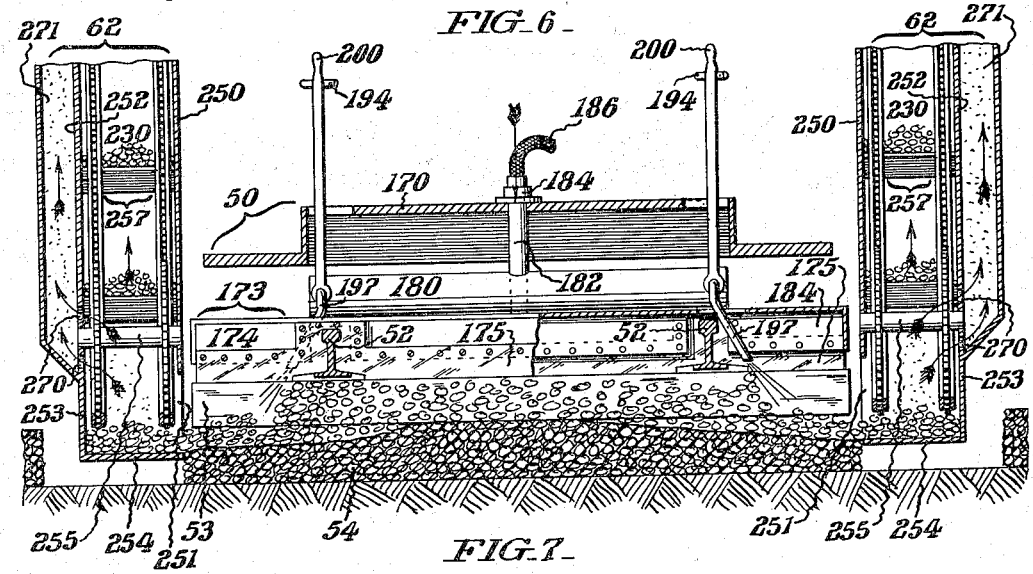
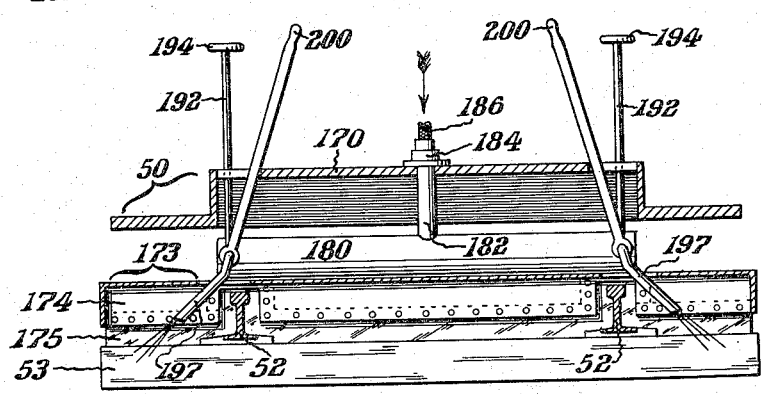
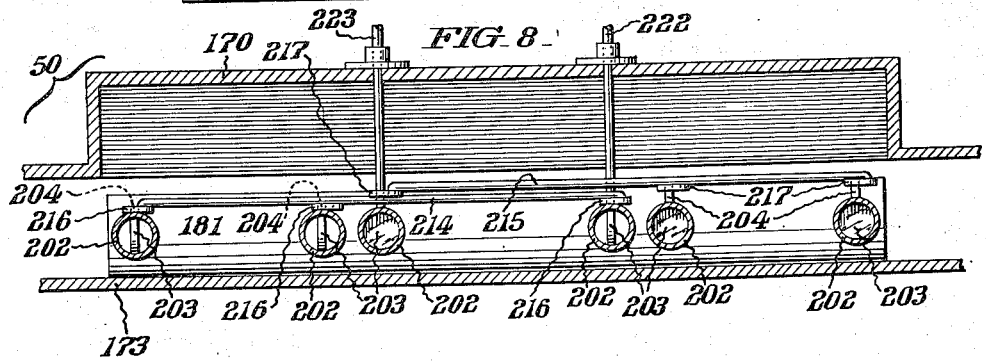
INVENTORS:
Harold H. Bach &
Charles L. Towle
BY
Paul & Paul
ATTORNEYS.

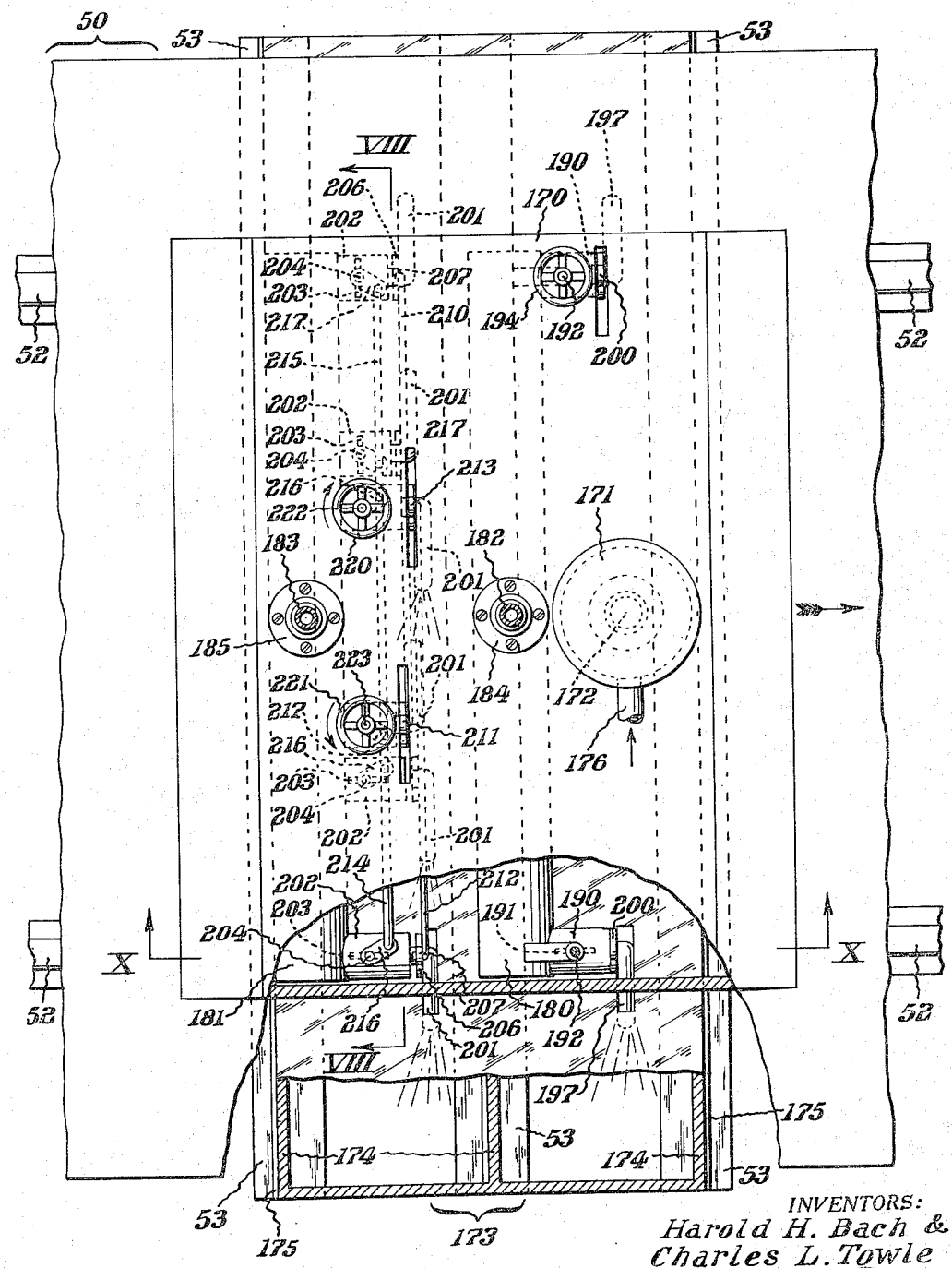

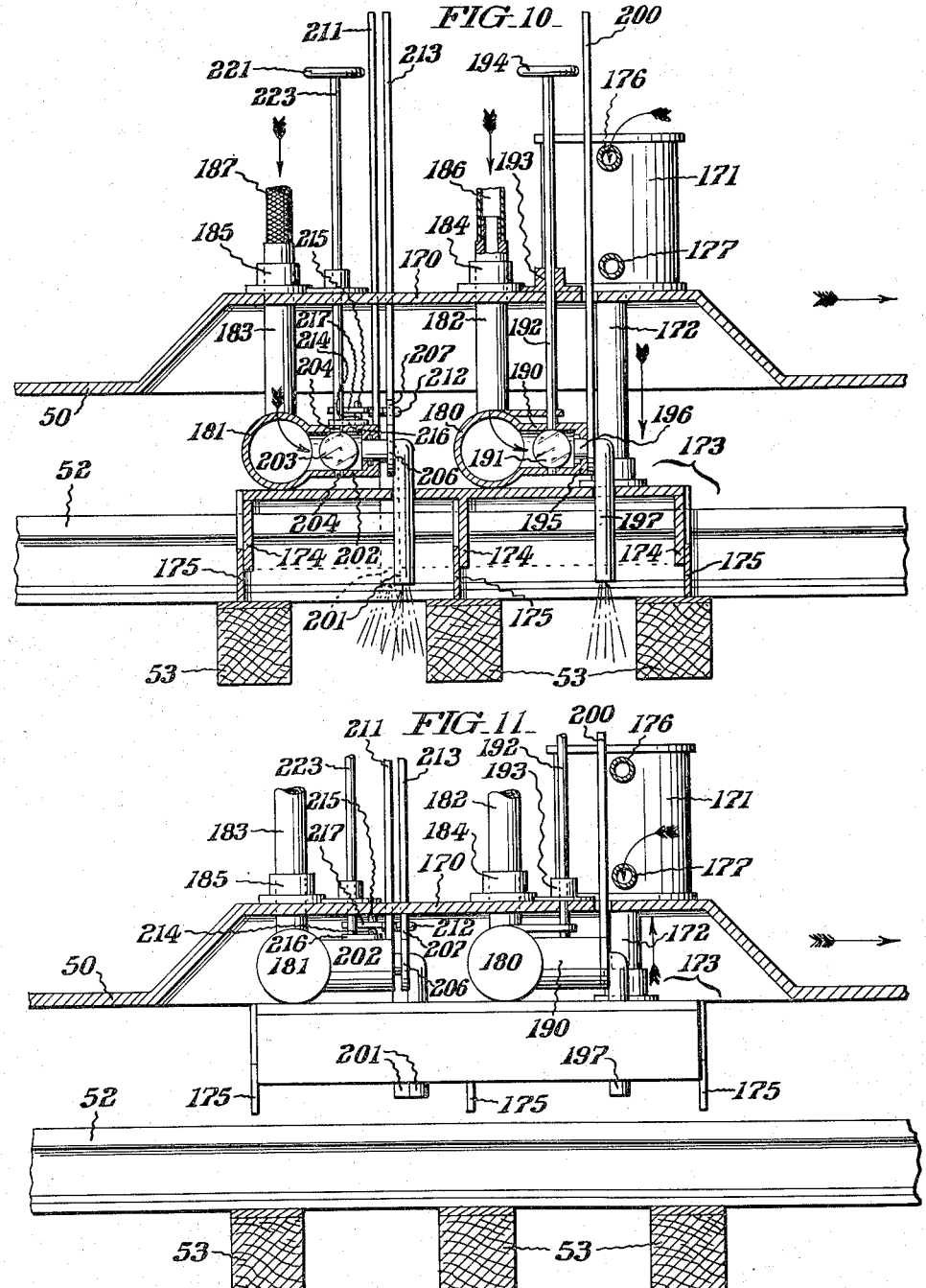

Dec. 25, 1956   H. H. BACH ET AL   2,775,438
METHOD AND APPARATUS FOR PROCESSING BALLAST
Filed Sept. 6, 1951   19 Sheets-Sheet 9
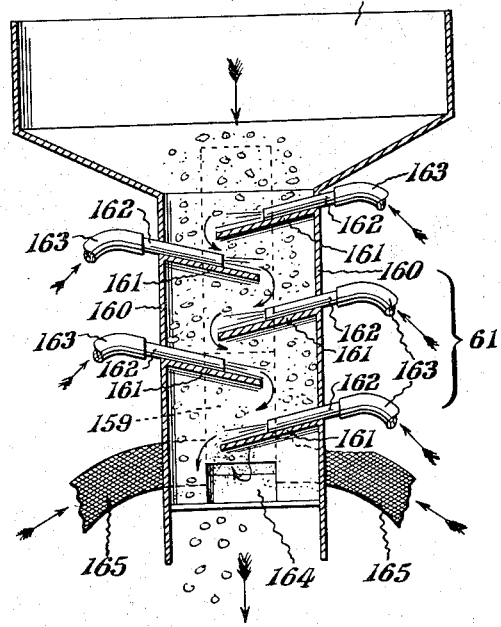
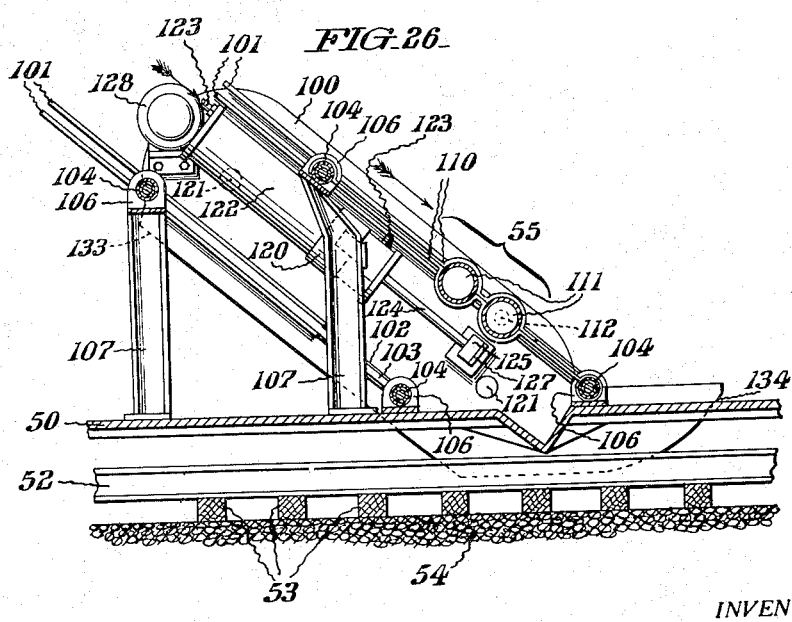
INVENTORS:
Harold H. Bach &
Charles L. Towle
BY Paul & Paul
ATTORNEYS.

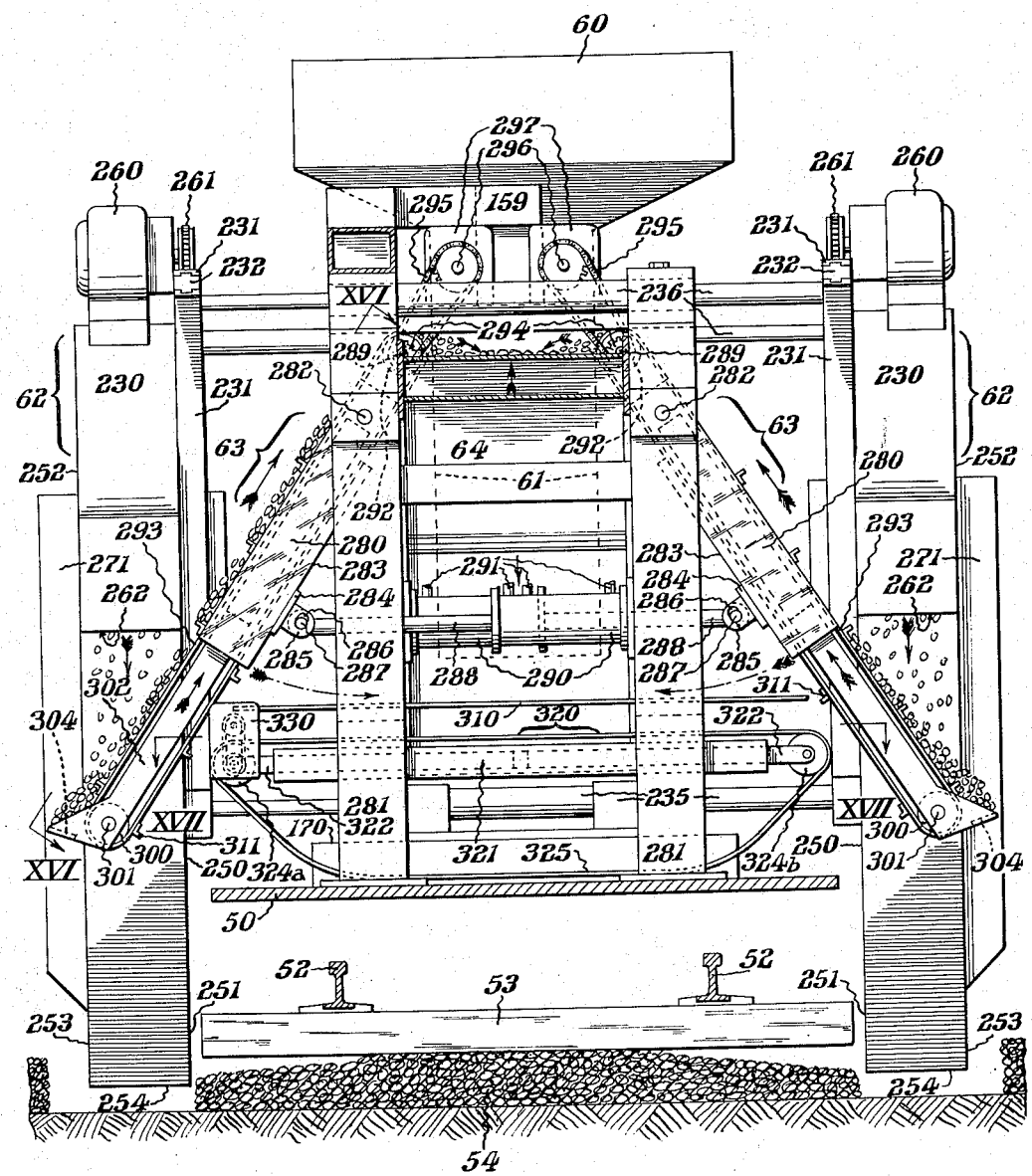

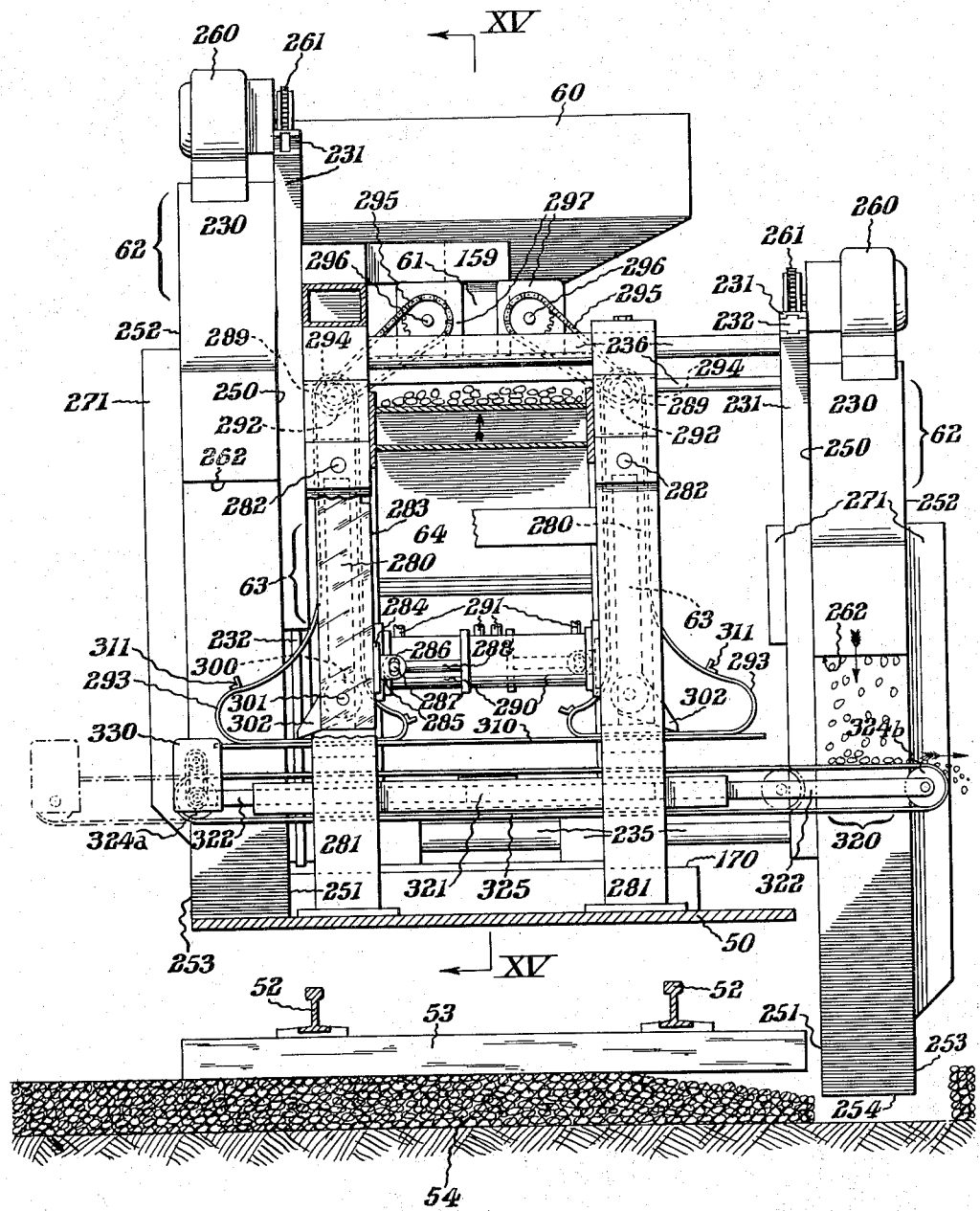

Dec. 25, 1956 H. H. BACH ET AL 2,775,438
METHOD AND APPARATUS FOR PROCESSING BALLAST
Filed Sept. 6, 1951 19 Sheets-Sheet 12

INVENTORS:
Harold H. Bach &
Charles L. Towle
BY Paul & Paul
ATTORNEYS.

Dec. 25, 1956 H. H. BACH ET AL 2,775,438
METHOD AND APPARATUS FOR PROCESSING BALLAST
Filed Sept. 6, 1951 19 Sheets-Sheet 13
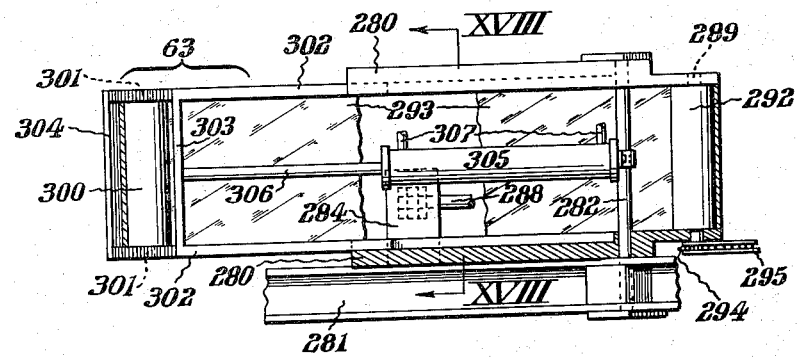
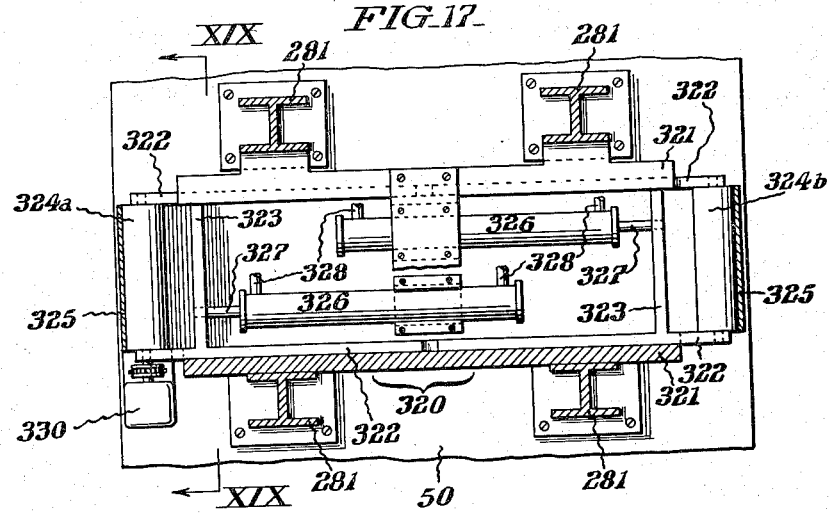
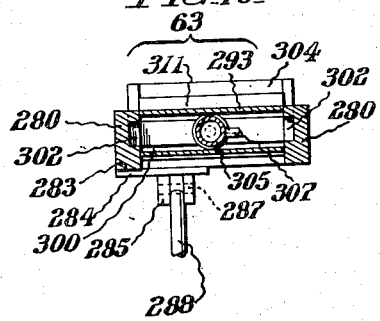
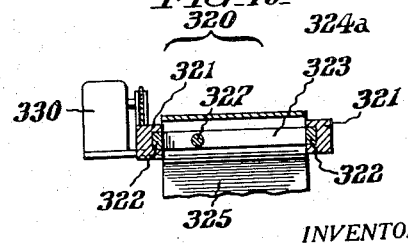
INVENTORS:
Harold H. Bach &
Charles L. Towle
BY Paul & Paul
ATTORNEYS.

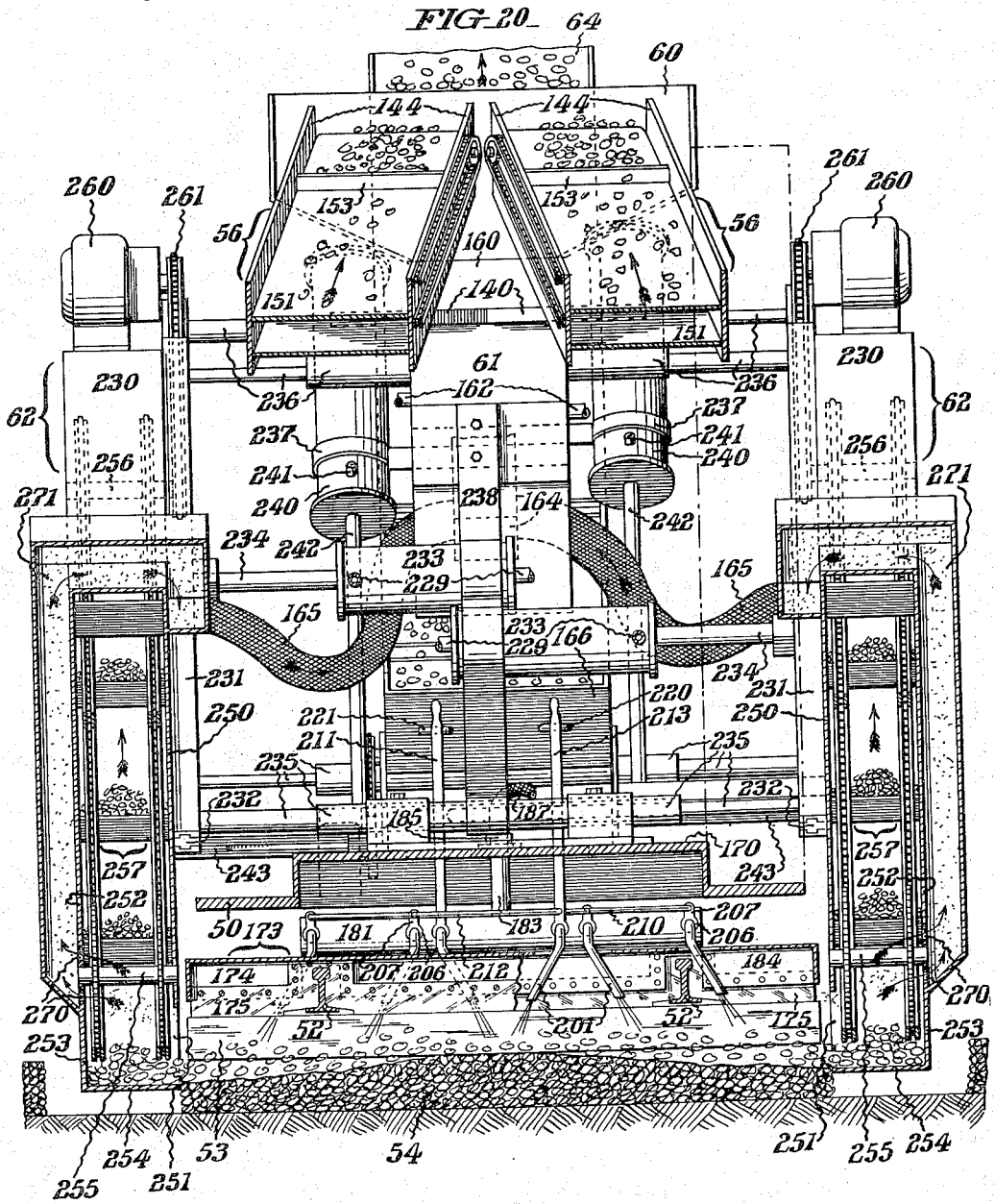

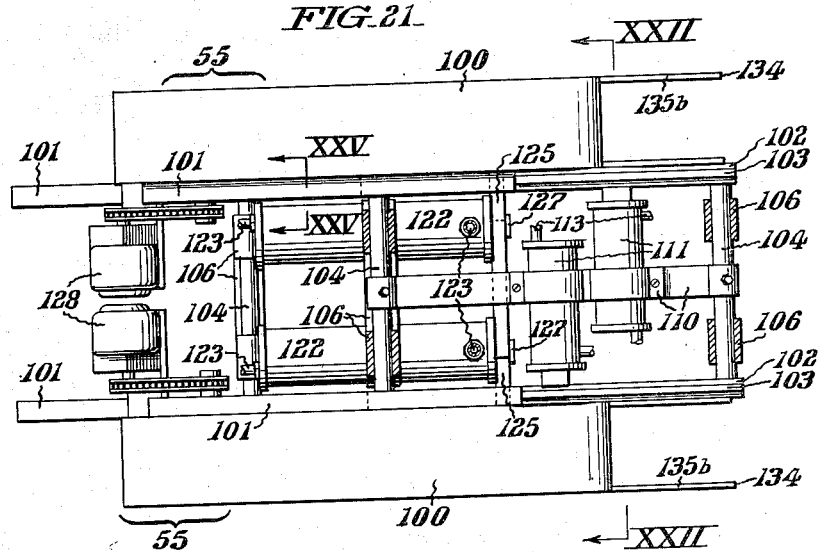
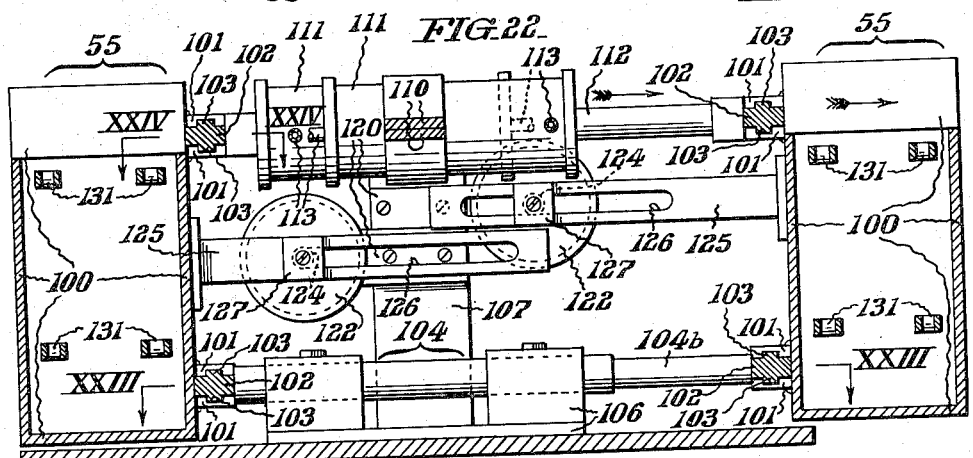
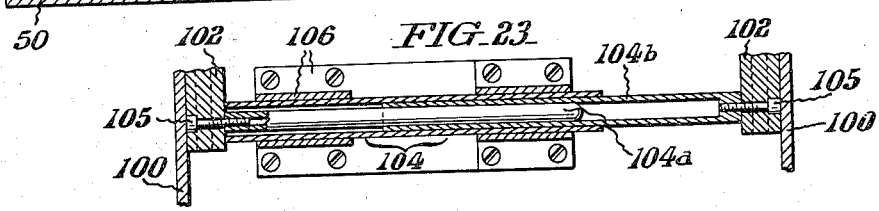
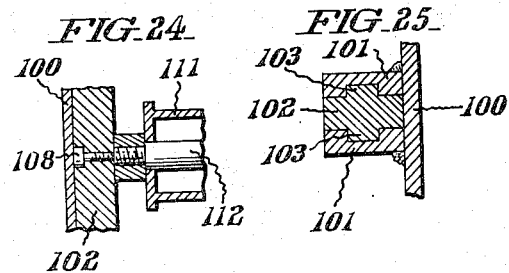

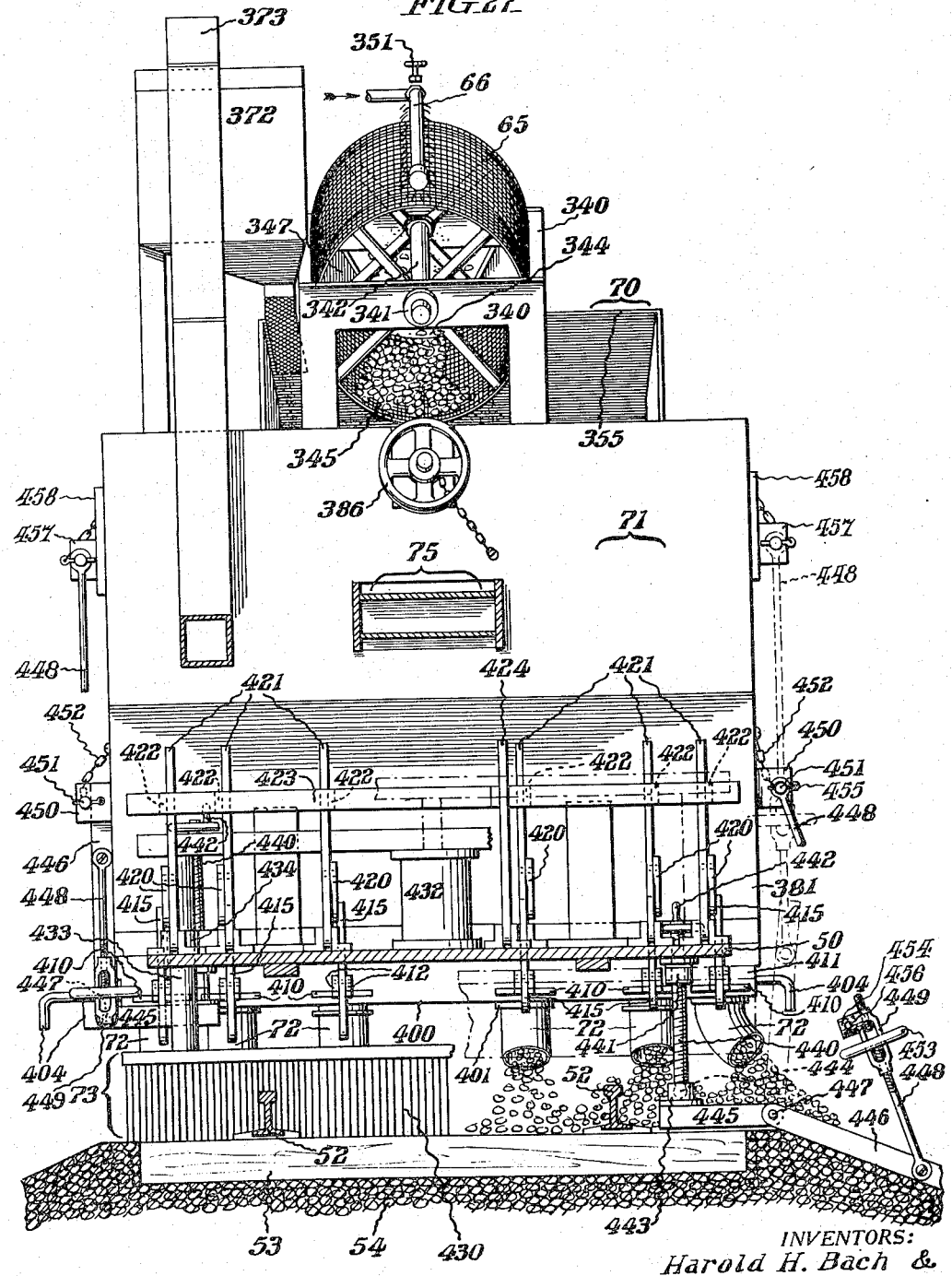

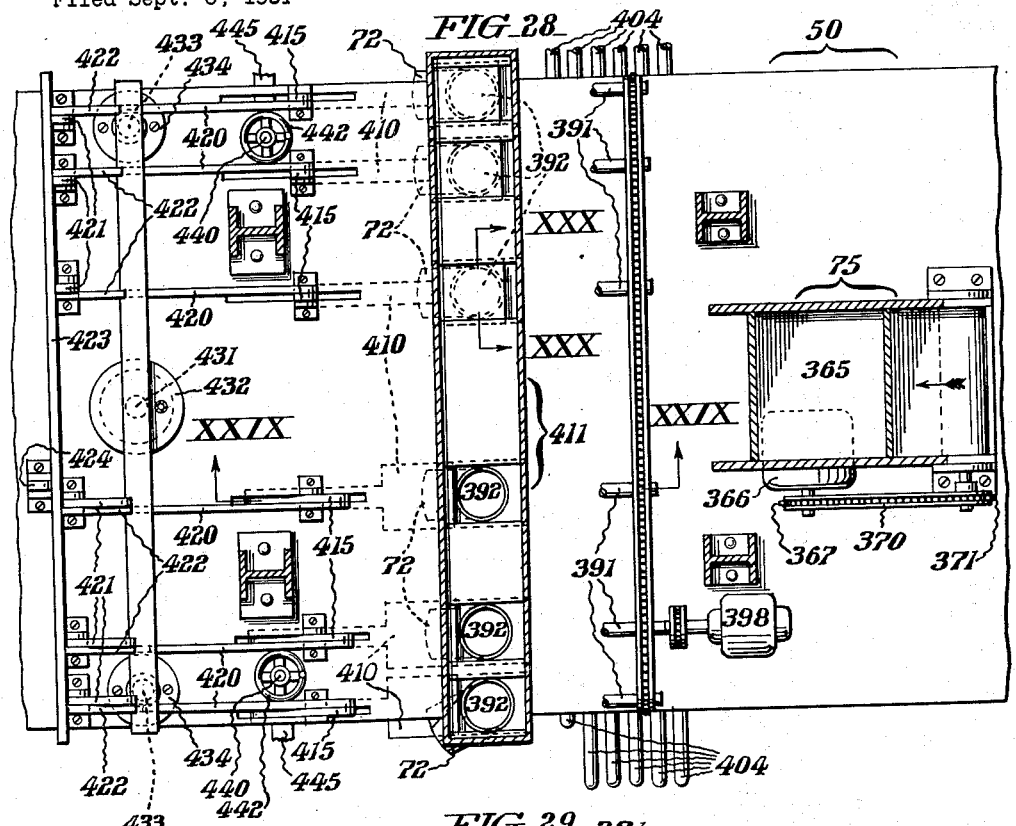
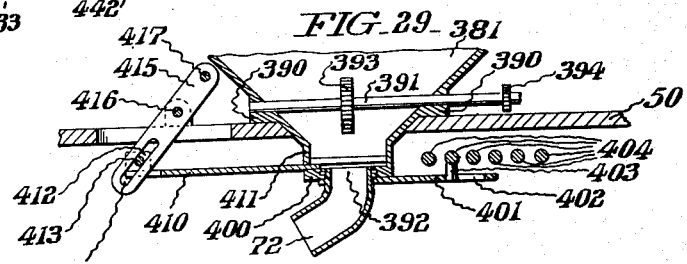
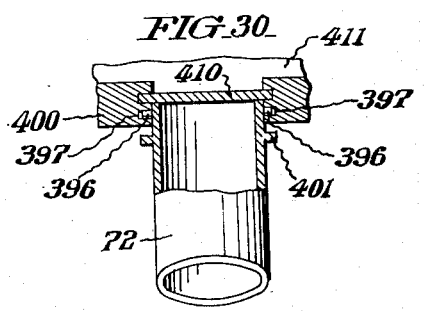

Dec. 25, 1956 H. H. BACH ET AL 2,775,438
METHOD AND APPARATUS FOR PROCESSING BALLAST
Filed Sept. 6, 1951 19 Sheets-Sheet 18
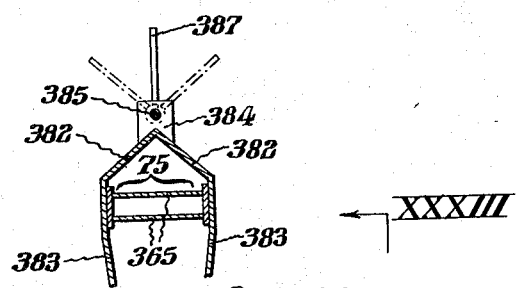
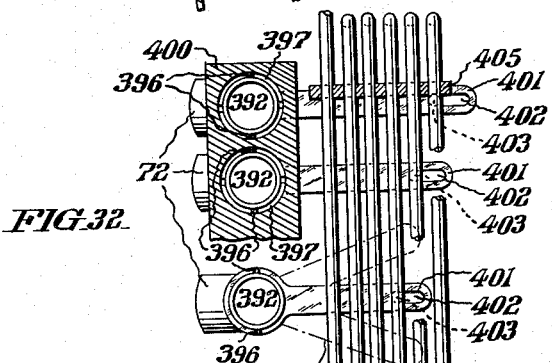
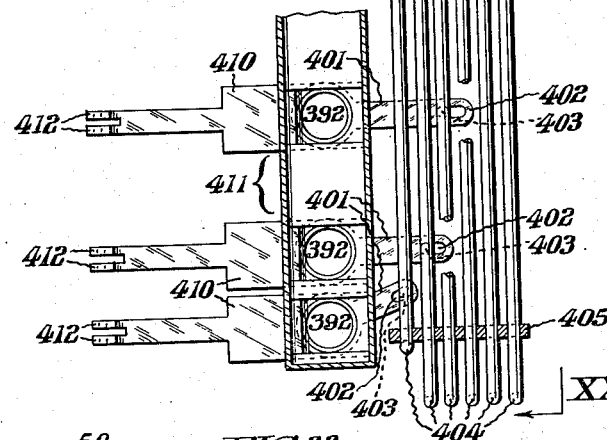
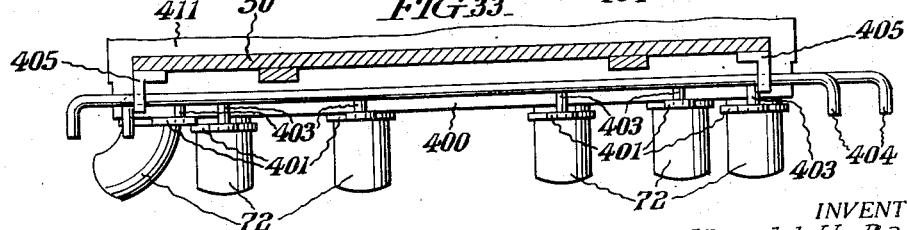
INVENTORS:
Harold H. Bach &
Charles L. Towle
BY Paul & Paul
ATTORNEYS.

Dec. 25, 1956   H. H. BACH ET AL   2,775,438
METHOD AND APPARATUS FOR PROCESSING BALLAST
Filed Sept. 6, 1951   19 Sheets-Sheet 19
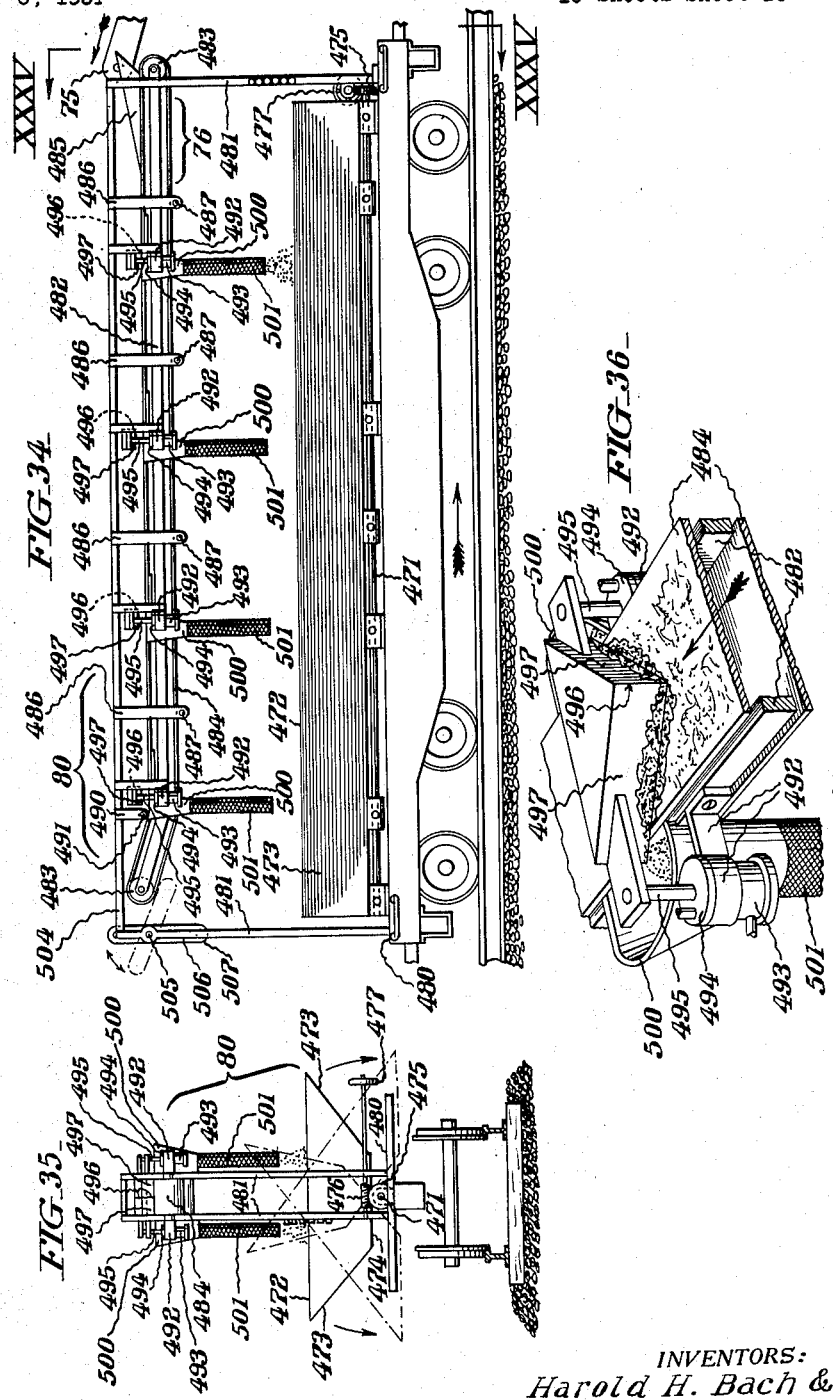
INVENTORS:
Harold H. Bach &
Charles L. Towle
BY Paul + Paul
ATTORNEYS.

United States Patent Office 2,775,438
Patented Dec. 25, 1956

2,775,438

METHOD AND APPARATUS FOR PROCESSING BALLAST

Harold H. Bach, Steubenville, Ohio, and Charles L. Towle, Philadelphia, Pa.

Application September 6, 1951, Serial No. 245,292

22 Claims. (Cl. 262—2)

This invention relates to a method and apparatus for processing ballast, and more particularly relates to a continuous method and apparatus for removing ballast from the crib between track ties, and for handling and cleaning the ballast.

It is common knowledge that the proper maintenance of railroad tracks is dependent upon rapid drainage of water therefrom. In the course of time dirt and other particles of finely divided material find their way into the spaces between the individual ballast particles and eventually plug or block these spaces to such an extent that drainage is seriously interfered with. The finely divided material forms a mud which fills in immediately under the ties, providing a soft, yieldable support for the ties. This results in loose track and poor track conditions. For the foregoing reasons it has been conventional to clean the ballast periodically in order to remove the finely divided particles to effect proper drainage.

Methods and machines have previously been proposed for removing and replacing ballast or effecting the automatic cleaning of ballast, but these methods have all been subject to rather serious objections. While certain machines have capacity to remove the ballast from the shoulders and inter-track spaces of the road bed, they are incapable of processing the ballast located in the cribs between ties, and more particularly the ballast located in the space between the ties and laterally between the rails. Other devices, involving mechanical means such as arms and the like have previously been proposed, such machines having means for moving the arms crosswise and into contact with the ballast in the cribs to move such ballast outwardly beyond the tie ends. However such procedures and apparatus are subject to the disadvantage that their operation is dependent upon proper spacing and parallel relation of the ties. Also the removal of ballast is impeded by reason of the presence of the rail at a point between the centers and ends of the ties.

Most existing machines have been specifically designed for carrying out only one specific ballast cleaning operation, thus necessitating the provision of several different machines, operating upon the road bed at different times, to effect complete ballast cleaning of the entire road bed.

Another disadvantage encountered in the operation of conventional ballast cleaners is that their construction is necessarily space consuming, with resultant difficulty in providing for adequate clearance to accommodate the passage of trains on adjacent tracks. Moreover such machines have been characterized by their inability to return the cleaned ballast properly to the cribs and other spaces in the road bed.

Another difficulty encountered in connection with conventional ballast cleaning procedures is that the ballast is not sufficiently clean when subjected to a single sequence of ballast cleaning steps, and as a result it is frequently necessary to repeat the cleaning operation on the same road bed in order to provide adequate cleaning.

Moreover most ballast cleaning methods and apparatus of the prior art are objectionable in that no means have been provided for effecting the efficient disposal of the dirt, coal dust, and other fine particles separated from the ballast.

It is accordingly an object of the invention to provide a method and apparatus for removing ballast from the crib between track ties. Another object is to provide method and means for effecting continuously the complete removal and cleaning or disposal of the shoulder ballast, inter-track ballast and crib ballast of a road bed in a single operation. It is another object of the invention to provide method and apparatus for removing and cleaning crib ballast independently of physical contact with the ties or rails, and wholly uneffected by irregularities of tie spacing. Another object of the invention is to provide an apparatus wherein separate but interconnected means are provided for effecting the cleaning of shoulder ballast, inter-track ballast or crib ballast either together or independently of one another. Still another object of the invention is to provide a ballast cleaning apparatus including ballast handling elements having capacity to move inwardly and outwardly toward and away from the center line of the track, to provide prompt clearance for trains passing on adjacent tracks. Yet another object of the invention is to provide, in conjunction with ballast cleaning apparatus, improved means for returning the cleaned ballast to the road bed. It is still another object of the invention to provide ballast cleaning means characterized by a double cleaning action on all ballast handled, thus improving the ballast cleaning and eliminating the requirement for double operation over the same stretch of road bed. Another object is to provide improved method and apparatus for separating the dirt and fine particles from the cleaned ballast, and for disposing of or otherwise handling or temporarily storing the dirt thus separated. Other objects and advantages of the invention, including the simplicity of construction and operation of the ballast handling elements and the efficiency with which they may be constructed and arranged on a movable carriage, will appear in further detail hereinafter and in the drawings whereof:

Fig. 1 is a view in side elevation of a ballast cleaning and handling apparatus constituting one embodiment of our invention.

Fig. 2 is an enlarged fragmentary side elevation showing the forward portion of the ballast cleaning apparatus of Fig. 1. In this figure the ballast scoops and ballast collecting apparatus on the near side of the ballast cleaning apparatus is in operative position in relation to the road bed, while the corresponding apparatus on the far side of the ballast cleaning apparatus is shown withdrawn to inoperative position on the railroad car.

Fig. 3 represents an enlarged fragmentary side elevation showing the rear portion of the ballast cleaning apparatus of Fig. 1.

Fig. 4 is a plan view of the forward portion of the ballast cleaning car shown in Fig. 2.

Fig. 5 represents a plan view of the rear portion of the ballast cleaning apparatus, as shown in Fig. 3.

Fig. 6 represents a sectional view showing the forward portion of the ballast dislodging apparatus, taken as indicated by the lines and arrows VI—VI which appear in Fig. 2, both ballast collecting means being shown in operative position in relation to the road bed.

Fig. 7 is a view similar to Fig. 6, with certain parts displaced in order to show more clearly the manner in which they operate.

Fig. 8 represents a sectional view taken as indicated by the lines and arrows VIII—VIII which appear in Fig. 9.

Fig. 9 represents a sectional view in plan, taken as indicated by the lines and arrows IX—IX which appear in Fig. 2.

Fig. 10 represents a sectional view taken as indicated by the lines and arrows X—X which appear in Fig. 9.

Fig. 11 represents the sectional view similar to Fig. 10, with the apparatus shown in its inoperative position, raised above the track.

Fig. 12 represents a sectional view of one ballast cleaning element of the apparatus, taken as indicated by the lines and arrows XII—XII which appear in Fig. 2.

Fig. 13 represents a sectional view of ballast cleaning apparatus, taken as indicated by the lines and arrows XIII—XIII which appear in Figs. 2 and 4.

Fig. 14 represents a sectional view similar to Fig. 13, with certain of the parts displaced and otherwise shifted relative to one another in order more clearly to illustrate the construction and operation of the apparatus.

Fig. 16 represents a sectional view in plan, taken as indicated by the lines and arrows XVI—XVI which appear in Fig. 13, certain of the parts being broken away and shown in section in order more clearly to illustrate important construction details.

Fig. 17 represents a sectional view in plan, taken as indicated by the lines and arrows XVII—XVII which appear in Fig. 13.

Figs. 18 and 19 are sectional views taken as indicated by the lines and arrows XVIII—XVIII and XIX—XIX, which appear in Figs. 16 and 17, respectively.

Figs. 20 and 21 represent sectional views taken as indicated by the lines and arrows XX—XX and XXI—XXI, which appear in Figs. 2 and 4.

Fig. 22 represents a sectional view taken as indicated by the lines and arrows XXII—XXII which appear in Fig. 21.

Figs. 23 and 24 represent sectional views taken as indicated by lines and arrows XXIII—XXIII and XXIV—XXIV which appear in Fig. 22.

Fig. 25 represents a sectional view taken along the lines and arrows XXV—XXV which appear in Fig. 21.

Fig. 26 represents a sectional view taken as indicated by the lines and arrows XXVI—XXVI which appear in Fig. 4, showing the ballast scooping element in an intermediate position as it is lowered toward the ballast.

Fig. 27 is a sectional view taken as indicated by the lines and arrows XXVII—XXVII which appears in Fig. 3.

Fig. 28 represents a sectional view taken as indicated by the lines and arrows XXVIII—XXVIII which appear in Fig. 3.

Figs. 29 and 30 represent sectional views taken as indicated by the lines and arrows XXIX—XXIX and XXX—XXX which appear in Fig. 28.

Figs. 31 and 32 represent fragmentary sectional views taken as indicated by the lines and arrows XXXI—XXXI and XXXII—XXXII which appear in Fig. 3.

Fig. 33 represents a sectional view taken as indicated by the lines and arrows XXXIII—XXXIII which appear in Fig. 32.

Fig. 34 represents a side elevation of dirt storage and disposal apparatus in accordance with one embodiment of the invention.

Fig. 35 represents an end view of the apparatus, taken as indicated by the lines and arrows XXXV—XXXV which appear in Fig. 34, and Fig. 36 represents an enlarged perspective view of diverter apparatus shown in Figs. 34 and 35.

Figure 1:
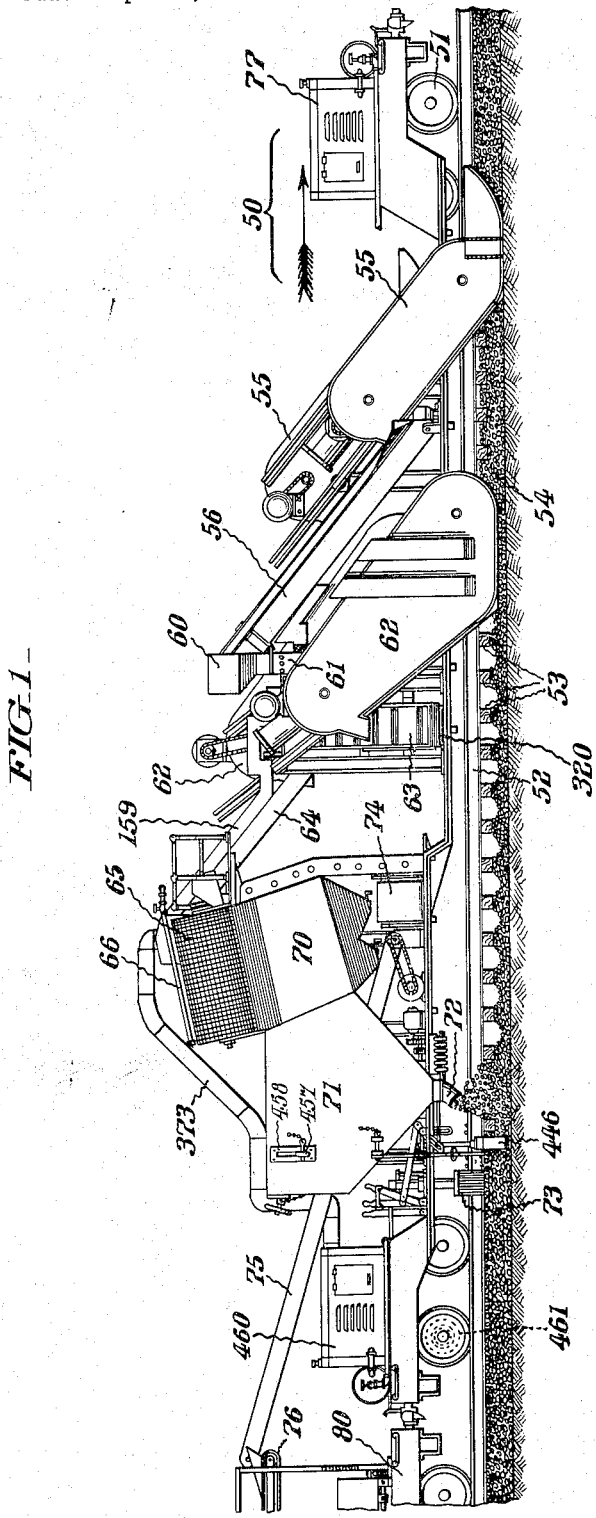
Figure 15:
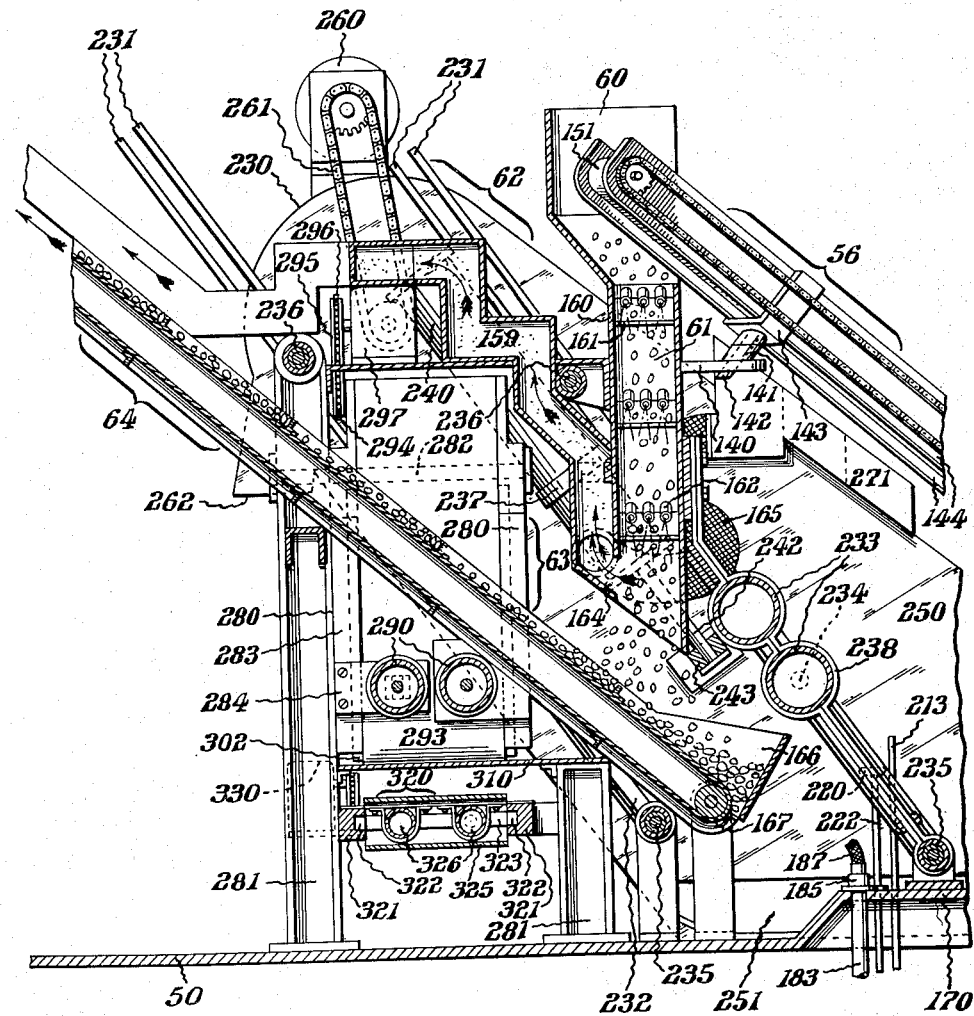
Fig. 15 represents a sectional view taken as indicated by the lines and arrows XV—XV which appear in Fig. 14.

It will be appreciated that the apparatus shown in the drawings may be modified in many particulars in accordance with the invention, and that the specification which follows constitutes a description of the single embodiment of the invention shown in the drawings.

The arrangement of the individual elements of the ballast cleaning apparatus will first be described generally, with reference to Fig. 1 of the drawings. The bal-last cleaning apparatus is mounted on a railroad car 50, which preferably has an overframe or other structural means omitted from the drawings for the sake of clarity, is supported by wheels 51 traveling on rails 52 supported on cross ties 53 in ballast 54. Located at the forward end of the car are a pair of shoulder and inter-track scoops 55 which travel beyond the ends of the ties 53 and serve to scoop up the ballast in the shoulders and inter-track spaces. Scoops 55 elevate and discharge the ballast into the elevator-conveyers 56 which in turn discharge the ballast into hopper 60 of a ballast cleaning chamber 61.

Also disposed on the car 50, rearwardly of the scoops 55, are a pair of crib ballast collectors 62 cooperating with fluid jet means (further to be described) to remove and collect the ballast from the cribs or inter-tie spaces. Collectors 62 discharge the ballast from the cribs to the transverse elevator-conveyers 63 from which it is discharged, along with the ballast from the shoulders and inter-track spaces, on longitudinal conveyor 64. Conveyor 64 discharges the mixed ballast to the mouth of a rotary screen 65, wherein the ballast is separated from the dirt which falls into dirt bin 70. Rotary screen 65 is equipped with a fluid jet conduit 66 for cleaning the screen of mud and dirt when fouled. The ballast is discharged from the lower end of rotary screen 65 into ballast storage bin 71 carrying ballast distributing conduits 72 for returning the clean ballast to the track. A brush 73 is mounted on the car 50 rearwardly of conduits 72, and serves to remove ballast from the top faces of the ties and to level the ballast between and around the ties. The dirt from bin 70 may be collected on an extensible laterally-shiftable cross conveyor 74 for disposal to either side of the track bed, or on longitudinal dirt conveyor 75 which is disposed above and coacts with similar conveyors 76 connected to dirt storage car 80. The number 77 designates a fluid compressor or pump, preferably an air compressor, which is operatively connected to the ballast cleaning and other apparatus, as will further be described.

Proceeding now to a detailed description of the drawings, reference is first had particularly to the shoulder and inter-track scoops 55 represented particularly in Figs. 2, 4, 21–26 of the drawings. Each scoop 55 is substantially enclosed in the walls of housing 100 to the inner sides of each of which are affixed pairs of spaced-apart channel irons 101 (Figs. 2, 25). Longitudinally slidable along channel irons 101 are the support bars 102 which have integral offset strips 103 shaped to fit within the channels of irons 101. Support bars 102 are each fixed at each end to a transverse telescopic shaft 104 by means of screws 105. Each telescopic shaft 104 consists of two mutually slidable tubes 104a, 104b, supported by transverse brackets 106. The transverse brackets 106 at the upper ends of the support bars 102 are fixed to the vertical beams 107 while the transverse brackets 106 at the lower ends of the support bars 102 are fixed to the floor of the car 50. Thus the walls of housing 100, and the entire scoop elements 55 supported thereon, are free to slide bodily horizontally toward and away from the longitudinal center of the ballast cleaning car 50.

Means are provided for effecting the foregoing movement of the scoops 55 inwardly and outwardly of the car. Fixed to the matched brackets 110, which are attached to the upper and lower brackets 106, are the transverse actuator cylinders 111. Each cylinder 111 has a piston shaft 112 fixed by screw 108 to one of the support bars 102, at a point about midway between the ends, as shown in Figs. 2, 4 and 24. Each cylinder is selectively operated by air or other fluid under pressure, controlled by valves or like means, and introduced to the cylinder through conduits 113 which move the piston shafts 112 inwardly and outwardly of the cylinders 111. Such transverse movement is transmitted through the support bars 102 and channel irons 101 to the scoops 55.

Means are also provided for lowering and raising the scoops 55 bodily toward and away from the track bed. Fixed in transverse brackets 120 supported on vertical standards 107 (Fig. 26) are a pair of scoop elevator cylinders 122 having conduits 123 for introducing and exhausting an operating fluid such as steam or compressed air, for example, to reciprocate the piston shafts 124. Rigidly mounted on each inner side wall 100 of the housing for each scoop 55 are transverse heavy rigid bars 125 having slots 126 through which the piston rods 124 extend. Blocks 127 are affixed to the ends of piston rods 124 and overlap the bottom surfaces of rigid bars 125 with capacity to permit transverse sliding movement thereof. Thus the cylinders 122 have capacity to move each scoop 55 bodily toward and away from the track bed, independently of the movement of the other scoop 55 and independently of the movement of either scoop 55 transversely of the car.

Each scoop 55 carries a sharp-edged scoop plate 129 at its lower forward end which serves to scoop the ballast from the track bed. A pair of spaced-apart transverse axles 121 are rotatably mounted in bearings on the side walls of housing 100 (Fig. 2), together with sprocket wheels 130 around which a chain 131 is trained. Chains 131 are driven in conventional manner by motors 128 which are mounted on, and move with the housings 100. Fixed at spaced points to each chain 131 are a plurality of upright paddles 132 which coact with the curved bottom plate 138 forming a continuous under-acting conveyor 139 for the ballast delivered from scoop plate 129 under the influence of the movement of the car along the track. The scoop 55 has an integral down-spout 133 for delivering the ballast elevated from the scoop plate 129 by paddles 132. Sets of rigid runners 134 are formed integrally on the lower forward ends of the scoops 55 and serve to detect foreign objects in the cleaning area and to raise the entire scoop assembly 55, along the longitudinal axes of support bars 102, thus minimizing possible damage from contact with fixed objects imbedded in the ballast. Also mounted on the lower forward end of the scoops 55 are the laterally shiftable vertical plates or wings 135 consisting of a relatively short plate 135a and a relatively long plate 135b hinged together at their adjacent edges. Each plate 135a is also hinged to the outer side wall of the scoop housing 100. The extensible rod elements 136, controlled by turnbuckle 137 to which is attached a handwheel 137a, are connected by means of eye joints to the inner side walls of the scoop housing, and to the leading edges of plates 135b. Similar extensible rod elements 138 are attached to the joint between plates 135a and 135b, thus coacting with rod elements 136 and providing for controlled movement of the entire wing member toward and away from the solid and dot-dash line positions in Fig. 4. The width of the area to be scooped is thus controlled.

Elevating conveyor means 56 are provided for elevating the ballast delivered by the shoulder and inter-track scoops 55. Referring particularly to Figs. 2, 4, 15 and 20, the elevating conveyors 56 are supported on fixed brackets 140 each carrying a fixed collar 141 at an angle to the vertical. Pivoted in each collar 141 is a pin 142 fixed to the bottom of a U-shaped support 143 attached to the conveyor housing 144. Thus each conveyor housing 144 has capacity to swing about pin 142 as a pivot, between the solid-line and dot-dash-line positions shown in Fig. 4. Mounted on the floor of car 50 are a pair of curved brackets 145 having curved slots 146, each curved slot representing the arc of a circle drawn about the corresponding pin 142. Support brackets 147 which support the lower ends of the housing 144, rest on the curved bracket 145. A capped pin 150 fastened to the floor of the car extends through the slot 146, guiding and supporting the housing 144 as it swings bodily about pivot pin 142. A conventional endless conveyor belt 151, trained about rollers 152, having attached transverse angle irons 153 for elevating the ballast, is mounted in each housing 144. The conveyor belts 151 are positively driven through a chain drive by electric motors 154 which are affixed to the housing 144 and move with it.

Housing 144 has outwardly extending angled walls 155 at its lower forward end which serve to guide the ballast from scoop 55 to the belt 151 and further coact with the side walls of the scoop 55 to swing the elevating conveyor 56 inwardly and outwardly about its pivot 142, in response to the corresponding movement of scoops 55 inwardly and outwardly, under the influence of cylinders 111. The rear ends of the side walls of housing 100 of scoop 55 are accommodated between the angled walls 155 of elevating conveyor 56. The housing 100 has capacity to be moved upwardly and rearwardly in an inclined path by cylinders 122, independently of such walls 155. The housing 100 engages such walls 155 for ultimate movement jointly toward and away from the longitudinal center of the car.

Vertically disposed, substantially centrally in the car 50, is an upright ballast cleaning chamber 61, which is represented particularly in Figs. 2, 4, 12, 15 and 20 of the drawings. Chamber 61 has vertical front, back and side walls 160 supported in fixed position on the car 50, and has a hopper 60 positioned for receiving the ballast from elevating conveyors 56. Fixed alternately to opposite side walls 160 are baffle plates 161 each sloping downwardly from the side wall to which it is attached, toward the opposite side wall of the chamber, and each extending beyond the center of the chamber and terminating between the center and the opposite wall. Fluid blast nozzles 162 are disposed in sets of three above each baffle plate 161. Flexible conduits 163 are affixed to the nozzles 162 and to a source of air, steam, or any other fluid under pressure (not shown). The fluid blast means, thus arranged, together with the inclined baffles which serve as ballast tumbling means, serve to dislodge dirt and other particles from the ballast, to move the ballast in a tortuous path for free fall from each baffle plate to the one below, thereby jarring the ballast providing further separation of particles of dirt therefrom, and simultaneously to agitate the separated dirt and finely divided particles to move them downwardly through the chamber.

A vacuum duct 159 is fixed to the rear of ballast cleaning chamber 61. It communicates with an exhaust blower on the car (further to be described) thus effecting removal of the more finely divided dust and dirt particles at the bottom of chamber 61. Air is drawn into vacuum duct 159 through flexible hoses 165 from scoops 62 and is also drawn from the chamber 61 through opening 164, see Figs. 12, 20.

The ballast cleaning chamber 61 has an open bottom through which the clean ballast and larger particles of dirt drop to a hopper 166 on the lower end of inclined conveyor belt 167. The dirt on conveyor 64 is mixed loosely with, but not affixed to the ballast since it is substantially completely dislodged from the ballast in chamber 61. The mixed ballast and dirt handled in chamber 61, which were scooped from the shoulder and inter-track spaces of the track bed, are joined on conveyor belt 167 by dirt from the cribs or inter-tie spaces, which is removed from the cribs by the apparatus to be described.

Means including fluid jet apparatus are provided for removing the ballast from the inter-tie spaces or cribs, such means appearing in particular detail in Figs. 2, 4, 6–11, 13–20 of the drawings.

The floor of the ballast cleaning car 50 has a raised platform 170 to the rear of elevating conveyor 56, on the top of which the cylnder 171 is mounted. Cylinder 171 has a vertically disposed piston rod 172 reciprocable within the cylinder and fixed to the top of an inverted box 173 which carries vertical partition walls 174 preferably spaced substantially in accordance with tie spacing. Flexible curtains 175, made of leather, rubber or the like, are fixed to the vertical partitions 174 and have notches shaped to conform substantially to the transverse sectional shape of the rails 52, thus forming enclosed segregated chambers above the cribs. The entire box 173, together with attachments, is raised and lowered by cylinder 171, selectively actuated by compressed air, steam or the like, through compressed fluid links 176, 177, the flexible curtains 175 deforming for passage vertically relative to the rails 52.

Fixed on and supported by the box 173 are a forward manifold 180 and a rear manifold 181 both disposed transversely of the track rails 52. Vertical pipes 182, 183 are fixed to the tops of such manifolds respectively, and slidably disposed through the vertical guide sleeves 184, 185 fixed to platform 170. Flexible conduits 186, 187 are joined to pipes 182, 183 and are connected to a source of fluid under pressure (such as steam, compressed air, or the like), not shown. Forward manifold 180 carries a pair of integral branch pipes 190 one positioned substantially above each of the rails 52. Valves 191, positioned in each branch pipe 190, are operated by valve stems 192 vertically slidable through guide sleeves 193 and operated by hand-wheels 194 which rotate valve stems 192 about a vertical axis to open and close the valves. At the forward ends of each branch pipe 190 is a fluid-tight bearing 195 carrying a tube 196 having an angular bend and terminating in a fluid blast nozzle 197. Fixed to each tube 196 is a lever 200 which serves to swing each blast nozzle 197 about its pivot in bearing 195, to and from the positions indicated in Figs. 6 and 7.

It will be observed that the forward blast nozzles 197 are disposed outwardly of the rails 52 but inwardly of the ends of ties 53, and serve to blast the ballast outwardly from the spaces located between the ties outwardly of the rails.

Rear manifold 181, as illustrated particularly in Figs. 8, 9, carries six rear blast nozzles 201 constructed and arranged on the manifold 181 by means of branch pipes 202, carrying valves 203, and valve stems 204 substantially similar to the means previously described in relation to forward blast nozzles 197. However three of the rear blast nozzles 201, which are all directed toward one side of the track bed, carry fixed collars 206 with integral lever arms 207 pivoted to a common transverse rod 210 (Fig. 20), and to the lever 211. Similarly the other rear blast nozzles 201 also carry fixed collars 206 and lever arms 207 and are operated jointly by a common transverse rod 212 actuated by lever 213, and disposed slightly forwardly of the other set of three, for clearance. The valves 203 are similarly actuated in sets of three by means of the transverse rods 214, 215 operative through the link arms 216, 217 (Figs. 8 and 9) from hand wheels 220, 221 and vertically slidable shafts 222, 223 which are rotatable about a vertical axis.

Thus the rear blast nozzles 201 are arranged in two sets independently controlled and operated, and effective at readily variable angles upon the crib ballast located both inwardly and outwardly of the rails to move the ballast outwardly from the center to the sides of the track bed, into the area previously cleared by the forward blast nozzles 197 and toward the area previously cleared by the shoulder and intertrack scoops 55. The outermost two of the six rear blast nozzles 201 receive the ballast blown by the other four blast nozzles (from the central crib located between the rails into the outer crib, or the portion of the crib located outside the rails but within the tie ends) and in turn project this ballast further outwardly, beyond the tie ends. However, any combination of rear blast nozzles may be employed to move ballast from cribs outwardly beyond tie ends by intermittent or constant fluid action. The blast action of the fluid jets not only moves the ballast outwardly for collection, but serves to dislodge dirt from the individual pieces of ballast.

A pair of crib ballast collectors 62 are mounted on the car 50, laterally in line with both the forward and rear blast nozzles 197, 201. Each ballast collector 62 comprises a housing 230 having spaced pairs of spaced-apart, parallel, inclined channel irons 231 affixed to its inner side wall. These channel irons 231 are similar to the channel irons 101 of the shoulder and inter-track scoop 55 but disposed at a steeper inclination and inter-fit and coact with the elongate support bars 232 in the same manner as previously described in connection with scoop 55. The support bars 232 are moved inwardly and outwardly, transversely of the car 50, by transverse cylinders 233 (supported by brackets 238 and energized by fluid pressure means through conduits 229) having piston rods 234 attached to support bars 232, and act through the channel irons 231 to move the entire housing 230 inwardly and outwardly toward and away from the longitudinal center line of the car 50. Transversely disposed lower and upper telescopic guide shafts 235, 236 are fixed to the floor of the car 50 and to the elongate rods 232 and serve as guides and supports for the housing 230. Also mounted in fixed brackets 237 supported on car 50 are a pair of inclined cylinders 240 having conduits 241 for pneumatic or hydraulic actuating fluid. The pistons 242 of cylinders 240 engage the transverse slotted arms 243. These elements have construction and operation substantially the same as those represented in Fig. 22, previously described, and provide means whereby each housing 230 may be moved at an angle upwardly and rearwardly, and returned downwardly and forwardly. This movement of each housing 230 is independent of its movement inwardly and outwardly, and of all movement of the matching housing 230 disposed at the other side of the car 50.

Each housing 230 has an inner side wall 250 having at its bottom an opening 251 for reception of the mixed ballast and dirt, and an opposite outer side wall 252 having at its bottom a retainer plate 253 coacting with the bottom 254 to collect the ballast blown from the cribs by the forward and rear blast nozzles 197, 201. Mounted on spaced lower and upper shafts 255, 256 in each housing 230 is an under-acting continuous chain conveyor 257 substantially similar to conveyor 139 and driven through chain drive 261 by motor 260, which is fixed to the top of housing 230. Each housing 230 has an outlet conduit 262 through which the mixed ballast and dirt are discharged to the transverse elevator-conveyors 63.

The outer side wall of each housing 230 has a pair of horizontally-aligned, spaced openings 270 near its base and a pair of ducts 271 superposed over said openings 270 and extending vertically up the outside wall of the housing 230. Ducts 271 extend over the tops of housings 230 and down the inner side walls for connection to flexible hoses 165 which are connected to duct 159 at which point a vacuum is continuously applied, as previously described. Thus the fluid drawn through flexible hoses 165 flows from the base of housing 230 upwardly through the openings 270 and ducts 271 substantially as indicated by the arrows which appear in Fig. 20. This fluid flow carries the more finely divided particles of dirt previously dislodged from the ballast upwardly through the ducts 271 and thus separates them from the ballast and heavier dirt particles.

The elevator-conveyors 63, see particularly Figs. 2, 4, 13–16, 18, are each suspended from a pair of rigid channels 280 suspended from uprights 281 by pivot shaft 282. The back flange 283 of one channel 280 carries a plate 284 having a bearing 285 with a vertical slot 286 through which a pin 287 is positioned. Pin 287 is affixed to the end of piston rod 288 operated by pistons within transverse cylinders 290 which have connections 291 to a source (not shown) of fluid pressure for reciprocating the piston rods 288 to swing the rigid channels 280 about their pivots 282.

Across the upper ends of channels 280 in each elevating conveyor 63 is a rotatable shaft 289 carrying a roller 292 about which the conveyor belt 293 is trained. Shaft 289 also carries a sprocket 294 meshed with drive chain 295 driven by pinion 296 from motor 297. Drive chain 295 has enough slack to provide free limited swinging movement of sprocket 294 as the channels 280 swing about pivots 282.

The lower roller 300 is mounted on a shaft 301 rotatable in side arms 302 which are telescopically received in the channels 280. The side arms 302 are connected together at their lower ends by cross brace 303 having an integral bracket 304 for catching and retaining the mixed dirt and ballast discharged through outlet conduit 262 of ballast collector 62. Referring now particularly to Fig. 16, a cylinder 305, pivoted to pivot shaft 282, has a piston rod 306 attached to cross brace 303. Cylinder actuating fluid, introduced and exhausted through connections 307, reciprocates the piston rod thereby telescopically extending and contracting the conveyor. Thus the elevating conveyor 63 has capacity to swing inwardly to contract as indicated in Fig. 14, and to swing outwardly to extend to operative position, as shown in Fig. 13. The horizontal plate 310 supported by uprights 281 (Fig. 14) serves to support the slack belt 293 when the conveyor side arms 302 are retracted within channels 280. Conveyor belt 293 carries a plurality of spaced transverse angle irons 311 which support the ballast as it is conveyed upwardly for ultimate discharge on the longitudinal conveyor 64.

Also mounted on the uprights 281, laterally in line with the elevating conveyor 63, is a horizontally disposed ballast cross-conveyor 320, see particularly Figs. 2, 4, 13–15, 17, 19. Horizontal cross conveyor 320 comprises spaced channel-irons 321, side-arms 322, cross braces 323, end rolls 324a, 324b, belt 325 trained about end rolls 324a, 324b, and a pair of fluid actuated cylinders 326 having piston rods 327 operative upon cross-braces 323 to move each end roll transversely toward and away from the longitudinal center line of the car. Cylinders 326 are operated by actuating fluid through connections 328. Thus ballast from either collector 62 may be collected on cross conveyor 320 and distributed to the road bed outwardly of the tie ends, to either side of the track as indicated in solid and dot-dash lines in Fig. 14. The cross-conveyor 320 may be telescopically retracted to inoperative position, the belt 325 being slack, as shown in Fig. 13. An electric motor 330, mounted on the side arm 322 and coupled by a chain drive to the shaft driving the end roll 324a, moves inwardly and outwardly with the end roll 324a and serves to drive the belt 325.

Referring now particularly to Figs. 3, 5 and 27 of the drawings, a pair of brackets 340 carry bearings 341 supporting an inclined shaft 342 on which is mounted a cylindrical rotary screen 65 having an inlet opening 344 and an outlet opening 345 below the inlet 344, and is driven by suitable connections from motor 346. By suitable connections, not shown, the motor 346 may alternately oscillate the screen 65 or simply rotate it continuously in the same direction. A fixed hopper 347 receiving mixed ballast and dislodged dirt from the longitudinal conveyor 64 discharges into rotary screen 65. Above the rotary screen 65 a pipe 66 is mounted and connected to a source of air or other fluid under pressure and having a valve 351 controlling the fluid flow. Spaced holes or nozzles 352 are aligned along the bottom of the pipe 66 and directed against the rotary screen 65. The fluid jets thus directed serve to minimize clogging and keep the screen open.

Immediately below the screen 65 is a dirt bin 70 having rearwardly inclined front and back walls 354, 355 and ladder 356. Dirt bin 70 has forward and rear hopper bottoms 360, 361 equipped with slide valves 362, 363. A dirt cross-conveyor comprehensively designated 74 is arranged transversely of the car immediately below hopper bottom 360. Conveyor 74 is identical in construction to the ballast cross-conveyor 320, and is not further here described. An inclined longitudinal dirt conveyor 75 has a belt 365, driven by motor 366 through sprocket pinion 367, chain 370 and sprocket 371, is disposed immediately below the rear hopper bottom 361, and serves to transport dirt rearwardly for storage in dirt dumping containers further to be described. The dirt bin 70 also has a dust separator chamber 372 along its one side, which removes dirt and dust from the air or other fluid in duct 159 and drops the dirt and dust into dirt bin 70. The vacuum duct 159 from ballast cleaning chamber 61 is connected into the dust separator 372, and duct 373 is disposed rearwardly from chamber 372 to the intake side of a blower 374.

A ballast storage chamber 71 is mounted on the floor of car 50 and attached to the rear wall 355 of dirt bin 70, immediately below the outlet opening 345 of rotary screen 65. It has a hopper bottom 381. Referring particularly to Figs. 3, 5, 27 and 31, the ballast storage chamber is divided longitudinally into two side sections by a pair of longitudinally extending, outwardly inclined roof plates 382 which are supported in the ballast storage chamber 382 by a pair of vertical support plates 383. The dirt conveyor 75 with its belt 365 runs longitudinally through the entire length of ballast storage chamber 71, beneath the roof plates 382.

Spaced bearings 384 are fixed on roof plates 382, through which an inclined rock shaft 385 having handwheel 386 is disposed. A diverter plate 387 is fixed on the rock shaft 385 for selective guiding of the clean, dirt-free ballast to either side of ballast storage chamber 71.

Means are provided at the bottom of the hopper 381 for feeding the clean ballast to the cribs between ties and to the shoulders and inter-track spaces. Referring particularly to Figs. 28, 29, 30 of the drawings, the hopper bottom penetrates six apertures in the floor of the car and, for each opening, has flat-bottom bearings 390 maintaining a shaft 391 substantially horizontally at the hopper bottom. Directly above each of the six outlet openings 392 is an impeller wheel 393 which is fixed for rotation on shaft 391 driven mechanically by chains and motor 398 through gear 394. A curved distributor pipe 72 has pins 396 disposed within slot 397 of valve plate 400, and is free to rotate about a vertical axis to control the distribution of ballast under the influence of a lever 401, affixed to each curved pipe 72. Each lever 401 has a slot 402 (Fig. 32) accommodating pin 403 fixed to a slide rod 404 which is supported from angle irons 405 and hand operated for individual operation of each curved pipe 72. Adjacent levers 401 are staggered vertically for clearance.

Six slide valves 410 project through corresponding slots in valve bodies 411. At their free ends they carry spaced projections 412 carrying pins 413 disposed in the longitudinal slots 414 of levers 415, which are pivoted at 416 above the floor of car 50. At the upper ends of levers 415 are pins 417 engaging the ends of draw bars 420 which are pivoted substantially centrally on hand levers 421 (Fig. 3), which are also pivoted at their bases to the floor of car 50. Pivoted to the floor of the car rearwardly of the levers 421 is a master lever 424 to which is fixed a master cross-bar 423. Six latches 422, having offset notches 425, are fixed at laterally spaced points to the master cross-bar 423. Each individual hand lever 421 has a pin 426 adapted to travel independently between the ends of the offset notch 425, and may thus be moved independently of the other five individual hand levers 421. However by swinging the master hand lever 424 to a sufficient extent, in either direction, one or the other end of the offset notch 425 will engage the pins 426 of several individual hand levers and move such levers jointly in the same direction.

The number 73 represents a brush fixed on a central vertical shaft 431 with capacity to be lowered and raised toward and away from the track ties by fluid-actuated cylinder 432. A pair of guide shafts 433, fixed on the top of broom 430 and vertically disposed through guide sleeves 434 on the floor of car 50, serves as a guide for the broom as it moves up and down. The bristles of the broom are shaped to accommodate the track rails, see Fig. 27, as it levels ballast returned to the crib.

Ballast leveling means are also provided in accordance with the invention. An upright worm shaft 440 is rotatably mounted in a threaded bearing 441 fixed to the bottom of the car floor. Handwheel 442 is fixed to the top of shaft 440. A socketed foot piece 443 retains the ball 444 formed on the base of shaft 440, and carries the horizontal level-bar 445, which serves to level the crib ballast which is disposed outwardly beyond the rails. An elongated shoulder-leveling bar 446 is joined by pivot 447 to bar 445, and serves to level the shoulder ballast. A pair of rods 448 joined by turnbuckle 449, pivoted to shoulder-leveling bar 446 is detachably mounted on the car 50 to control the angle between bars 445, 446, thus controlling the inclination of the shoulder. A pair of spaced, apertured brackets 450, fixed to the wall of ballast storage chamber 71, receives the pivoted shoulder-leveling bar 446 when it is swung upwardly about pivot 447 to inoperative position where it is retained by pin 451 extending through the apertures of brackets 450. Pin 451 is mounted on ballast storage chamber 71 by chain 452.

Each turnbuckle 449 carries a handwheel 453 and a hollow socket member 454. Socket member 454 has an axial aperture of sufficient size to accommodate the end of pin 451, and a transverse aperture 456 of sufficient size to accommodate the cotter pin 455. A vertically adjustable bracket 457 is mounted in vertical track 458 on the side of car 50. Accordingly provision is made for rapid retraction of the shoulder leveling bar 446 toward the side of the car 50, from the solid-line position to the dot-dash line position as illustrated in Fig. 27. This is readily accomplished by removing cotter pin 455, lifting shoulder leveling bar 446 about its pivot 447, turning handwheel 453 and socket member 454 through one-quarter turn, fitting the central aperture of the socket member 454 over the end of pin 451, re-inserting cotter pin 455 through transverse aperture 456 and pin 451, and pinning the upper end of the upper rod 448 to the bracket 457.

For travel along the track the horizontal level-bar 445 may be first elevated by turning handwheel 442, and also adjusting turnbuckle handwheel 453 to reduce the total effective length of rods 448. The socket member 454 is then affixed to pin 451 as previously indicated and the upper end of upper rod 448 is affixed to the vertically adjustable bracket 457.

Mounted on the rear of the car 50 is a motor-generator 460, which supplies current for the various electric motors on the car. On one axle of car 50 an electric motor 461 is mounted. Motor 461 serves to propel the car 50. The number 462 represents a fuel tank for the motor-generator 460. Air compressor 77 provides fluid under pressure for operating the various actuating cylinders and fluid blast means of the apparatus. For fluid other than air, equivalent means are provided.

The ballast cleaning apparatus also includes a dirt storage container for the dirt removed from the ballast and carried on the dirt conveyor belt 365, see Figs. 34–36. While such apparatus is mounted on a separate car 80 in the disclosed embodiment, it will be appreciated that this is merely a matter of choice and that such apparatus is in many instances conveniently mounted on the same car as all the apparatus disclosed in Figs. 1–33. The car 80 has a central, longitudinal shaft 471 supporting a dirt receptacle 472 having outwardly inclined walls 473 and a relatively narrow, closed bottom 474. Fixed on the forward end of shaft 471 is a gear 475 meshing with worm 476 which is operated by the handwheel 477 which serves to tilt the receptacle 472 to one side or the other, as indicated by the dot-dash lines which appear in Fig. 35. Mounted on the floor 480 of the car 80 are spaced uprights 481 supporting the substantially horizontal, elevated bars 482. Rollers 483 are rotatable on each end of the bars 482 and belt 484 is trained about rollers 483.

Belt 484 is disposed directly below and coacts with the dirt conveyor 75 through trough 485 to effect continuous transportation of the dirt from the ballast cleaning apparatus.

Fixed at spaced points along the elevated bars 482 are pairs of uprights 486 supporting belt support shafts 487. Similarly, hanger members 490 suspend another transverse shaft 491 which serves to train the belt and to maintain it taut.

On each side of the belt 484 are rigid straps 492 which surround the bodies of cylinders 493 and form supports for the top flanges 494 integral with cylinders 493. Each cylinder 493 has a reciprocable shaft 495 which moves up and down under the influence of pressure fluid applied to the cylinder piston. A wedge-shaped diverter plate is attached to the ends of each pair of reciprocable shafts 495, having a leading edge 496 approximately centered with respect to the belt and angled wings 497 extending to the outer edges of the belt to divert the dirt to the sides of the belt when in contact therewith. By means of cylinders 493 these diverters are movable toward and away from the belt for selective diversion of the dirt therefrom. At each side of the belt, opposite the rear edge of each wing 497, is a funnel 500 to which is attached a flexible pendant tube 501 which extends to a point just above the top of dirt receptacle 472 for delivery of dirt from each funnel 500.

Supported from uprights 481 and top frames 504 is a pivot 505 supporting rigid bars 506 of an auxiliary conveyor belt 507, serving to transport dirt from car 80 rearwardly, either to a similar car or to another location as may be desired, all of the diverter plates 496 being raised away from belt 484 for dirt passage.

It is an important feature of the invention that the conveyor belt 484 is spaced above the tiltable receptacle 472 at a distance sufficient to clear the upper edges of the receptacle as it is tilted, and provided with auxiliary conveyor means for transporting the dirt rearwardly. Thus several cars 80 may be connected together to form one component of a ballast cleaning train and dirt may be conveyed to any dirt car 80 independently of dumping or other operation of intervening dirt cars 80.

*Operation*

From the foregoing the operation of the ballast cleaner shown in the drawings will be apparent. All the movable ballast handling elements of the ballast cleaning car 50 are initially retracted or moved to their inoperative positions and the car is moved along the railroad track, either under its own power or drawn by a locomotive to the track location where the ballast is to be cleaned. The ballast in the cribs is preferably prepared for the cleaning operation by subjecting it to a preliminary loosening operation, or crib breaking operation, which may be effected either manually or by machine by inserting an agitating tool into the ballast. The ballast cleaning car is then propelled continuously along the track at a low speed, for example a speed on the order of about one mile per hour, and the shoulder and inter-track scoops 55 are moved outwardly under the influence of cylinders 111, thus bringing the scoop housing 100 into contact with the angled walls 155 of elevating conveyor 56 and swinging the elevator 56 outwardly to its operative position. The scoop 55 is then lowered along its inclined tracks 101 for engagement with the ballast located in the shoulders and inter-track areas, beyond the tie ends. As the car 50 moves continuously forward, the scoop 55 digs a relatively wide channel as indicated in Figs. 13, 14 and 20 for example, into which channels the ballast collectors 62 are then lowered. The ballast thus removed from the shoulders and inter-track areas is conveyed to the ballast cleaning chamber 61, where the dirt is dislodged therefrom. The mixed dirt and ballast are deposited for travel on conveyor 64, and are further processed in rotary screen 65 in a manner further to be described.

The ballast blast means is lowered to a selected position immediately above the crib ballast and high pressure fluid, preferably a compressible fluid such as air or steam, for example, is turned into the fluid jet nozzles at a high pressure, say at 120 lbs. per square inch, for example. The ballast elevators and conveyors of the scoops and ballast collectors are set into operation, and fluid under pressure is introduced into the fluid jets of ballast cleaning chamber 61. The forward battery of fluid jets serves to move the ballast from the outer cribs (the spaces between the ties disposed outwardly of the rails) to the space cleared by scoop 55. Immediately thereafter the rear battery of fluid jets is similarly effective upon the inner crib ballast (located between ties and also between rails) to drive such ballast outwardly, beneath the rails and through the outer crib to the free space beyond the tie ends, previously cleared by the scoop 55.

Ballast collectors 62 deliver all the foregoing crib ballast, through the conveyor means described, to the rotary screen 65 wherein the dirt and ballast are separated. The separate dirt and ballast then fall into the storage bins 70, 71. As the car 50 progresses along the track, ballast stored in ballast box 71 as a result of previous ballast cleaning operations is continuously fed to the crib areas just emptied by the fluid blast means, and this ballast is distributed and leveled by the brush 73 and by the ballast leveling bars 445 and 446. Thus the ballast cleaning car 50 progresses continuously along the track, simultaneously handling and cleaning the shoulder ballast, the inter-track ballast and the crib ballast. The car 50 can be stopped at any point and any individual scoop 55 or ballast collector 62 rapidly raised away from the ballast and drawn inwardly toward the longitudinal center of the car 50 to provide train clearance for adjacent tracks. Also, at any point along the track, old ballast may be replaced by fresh ballast from the ballast box 71, the ballast cross conveyor 320 serving to discard the old ballast to either side of the track, as indicated in Fig. 14. The dirt separated from the ballast may be conveyed to the dirt storage car 80, it may be disposed of by means of dirt cross conveyor 74 or it may be retained in the dirt storage bin 70 for short periods until a suitable location for disposal is encountered.

Although we have described our invention by reference to one embodiment thereof, it will be apparent to those skilled in the art that changes may be made in the particular form and arrangement of parts of the apparatus, including reversals of parts and substitution of equivalent mechanisms, as well as changes in the sequence of steps of the method, and that certain features of the invention may be used to advantage independently of the use of other features, all without departing from the spirit of the invention as defined in the annexed claims.

Having thus described our invention, we claim:

1. Apparatus for removing ballast from the crib between track ties comprising a support movable along the track, a source of pressurized, compressable fluid on said support, pressure fluid directing means carried by said support and connected to said source, said directing means being located inwardly of the rails above the crib and aimed downwardly and outwardly toward the crib, ballast digging means carried by said support outwardly of the tie ends, and ballast collecting means carried by said support outwardly of said directing means and rearwardly of said digging means.

2. Apparatus for removing ballast from the crib between track ties comprising a carriage movable along the track, pressure means on said carriage for providing fluid at a positive pressure substantially above atmospheric pressure, blasting means connected to said pressure means and arranged on said carriage for directing a jet of high pressure fluid against the ballast intermediate said ties with capacity to displace such ballast outwardly of the tie ends and simultaneously to remove loose material from the ballast, retaining means carried by the carriage and movable with the blasting means, said retaining means being disposed outwardly of the tie ends and coacting with the blasting means to restrict the outward movement of the ballast and to collect said ballast and conveyor means for lifting the ballast from said retaining means.

3. Apparatus for removing ballast from inter-tie spaces in track beds, comprising a support movable along the track, a scoop on said support for removing ballast to clear a space outwardly of the tie-ends, ballast trapping means on said support rearwardly of said scoop means, and extending into the space cleared by said scoop, a source of fluid under pressure, pressure fluid directing means connected to said source and aimed at the crib at an inclination relative to the plane of the track to move the crib ballast outwardly to said ballast trapping means, and conveyor means for lifting the ballast from said ballast trapping means.

4. The apparatus defined in claim 3, further characterized by the provision of adjusting means carried by the support and connected to the ballast trapping means, whereby the ballast trapping means is adjustable to operate at varying depths relative to the track ties.

5. In apparatus for removing ballast from the crib between ties, said crib including shoulder ballast disposed outwardly of the tie ends, outer crib ballast located between the ties outwardly of the rails and inner crib ballast located between the ties inwardly of the rails, the combination comprising a carriage movable along the track, means carried by the carriage for removing shoulder ballast creating a space outwardly of the tie ends, outer fluid projecting means carried by the carriage directed against said outer crib ballast with a force sufficient to move said outer crib ballast outwardly to the space beyond the tie ends, and inner fluid projecting means carried by the carriage operative subsequently to said outer fluid projecting means and directed against said inner crib ballast with a force sufficient to move said inner crib ballast outwardly beyond the tie end.

6. The combination defined in claim 5 wherein the outer and inner fluid projecting means are pivotally mounted for angular swinging movement relative to the crib.

7. The combination defined in claim 5 wherein the inner fluid projecting means is located rearwardly of the outer fluid projecting means.

8. Apparatus for removing ballast from the cribs between ties of a track bed comprising a support movable along the track, fluid jet means mounted on said support, means for directing said fluid jet means toward said crib ballast, and wall members extending downwardly from said support above said ballast and surrounding said fluid jet means to form a chamber above the ballast, certain of the wall members being disposed transversely of said rail, said transverse wall members comprising flexible material having notches shaped to conform substantially to the transverse sectional shapes of the rails.

9. In a ballast cleaning apparatus the combination comprising a carriage movable above the ballast, scoop means carried by the carriage extending into the ballast, power means for moving the scoop inwardly and outwardly toward and from the carriage, a housing carried by the carriage rearwardly of said scoop, said housing being pivotally connected to the carriage for swinging movement about a substantially vertical axis, elevator means disposed within said housing for elevating the ballast received from the scoop, and connecting means between the scoop and housing for swinging the housing in response to the movement of the scoop.

10. The combination defined in claim 9 wherein the connecting means includes a wall member arranged between the scoop and housing serving to direct ballast from the scoop to the housing.

11. Apparatus for removing ballast from inter-tie spaces in track beds, comprising a support movable along the track, a scoop on said support for removing ballast to clear a space outwardly of the tie-ends, ballast trapping means on said support rearwardly of said scoop means, and extending into the space cleared by said scoop, ballast projecting means operative transversely of said rails upon the inter-tie ballast to move it outwardly to said ballast trapping means, conveyor means for lifting the ballast from said ballast trapping means, said ballast projecting means being in the form of a fluid blast directed against the ballast to clean it as it is moved outwardly, and suction apparatus attached to said ballast trapping means to separate from the ballast the finely divided solids dislodged from the ballast by said fluid blast.

12. Apparatus for cleaning track ballast comprising a carriage movable along the track, scoop means movable with said carriage and extending into the foul ballast, conveyor means extending from said scoop means to a point above said carriage, an air blast chamber on said carriage in position to receive the foul ballast from said conveyor means, air jet means in said air blast chamber effective upon the foul ballast to dislodge dirt particles therefrom, screen means for separating the ballast from the dislodged dirt, and a distributor for returning the processed ballast to the road bed.

13. The apparatus defined in claim 12 wherein said conveyor means is an underacting conveyor including an inclined floor member and an endless belt carrying a plurality of spaced-apart upright paddles arranged to move upwardly adjacent said floor member.

14. The apparatus defined in claim 12 wherein said conveyor means includes an elevating conveyor which is pivotally mounted for swinging movement about a substantially vertical pivot.

15. The apparatus as defined in claim 12, further characterized by the fact that a series of inclined baffle plates are disposed in staggered relation at successive levels in the air blast chamber, and the foul ballast is introduced at the top of said chamber for free fall to contact said baffle plates in succession.

16. Apparatus for removing ballast from track beds comprising a support movable along the track, scoop means on said support for removing ballast to clear a space outwardly of the tie ends, a ballast storage container on said support, first conveyor means for carrying the ballast from said scoop to said storage container, ballast trapping means on said support rearwardly of said scoop means and extending into the space cleared by said scoop, ballast moving means in the form of a fluid blast means also having capacity to dislodge dirt from the ballast as the ballast is moved, said ballast moving means being carried by said support and operative transversely of the track rails upon the inter-tie ballast to move it outwardly to said ballast trapping means, second conveyor means for carrying the ballast and dislodged dirt from the ballast trapping means to said storage container, and means on said support for cleaning the ballast, separating said dislodged dirt and returning the ballast to the track bed.

17. Apparatus for removing ballast from track beds comprising a car frame mounted on wheels for movement along a railroad track, a scoop adjustable vertically of said car frame to extend into the ballast located outwardly of the tie ends, first conveyor means extending into said scoop to lift the ballast handled by said scoop and thereby clear a space located outwardly of said tie ends, a ballast trapping chamber carried by said car frame outwardly of said tie ends and having an open side extending toward the track ties, said ballast trapping chamber being adjustable vertically of said car frame for movement at the desired level in the space cleared by said first conveyor means, a set of air jet projectors carried by said car frame above the track ties, means for adjusting the direction of said projectors to effect movement of the inter-tie ballast transversely of the rails to said ballast trapping chamber, and second conveyor means for removing the ballast from said trapping chamber.

18. Apparatus for removing ballast from the cribs between ties of a track bed comprising a support movable along the track, a source of fluid under superatmospheric pressure on said support, fluid jet means connected to said source mounted on said support, means for directing said fluid jet means toward said crib ballast to project said ballast outwardly of the rails, and wall members extending downwardly from said support above said ballast and surrounding said fluid jet means to form a chamber above the ballast.

19. In a device for removing ballast from track beds, a support, a fluid jet carried by said support above the inter-tie ballast, means for directing said fluid jet against the inter-tie ballast to project it outwardly of the track rails, a pair of opposed ballast trapping chambers suspended from said support outwardly of the opposite tie ends of the track, said ballast trapping chambers each having front, back and outside walls and an open side extending toward the track ties to receive the ballast projected by said fluid jet, and sealing walls of flexible sheet material extending transversely of the track and joining together the corresponding front and back walls of the opposed ballast trapping chambers, said sealing walls having recesses shaped to conform substantially to the contours of the track rails.

20. In a method of cleaning the crib ballast of a track bed which also includes shoulder ballast located outwardly of the crib, the steps which comprise removing said shoulder ballast from said bed to provide free space beyond the tie ends, projecting a pressurized fluid at a high velocity against the crib ballast with a force sufficient to dislodge dirt from the ballast, said fluid being aimed downwardly and outwardly toward the tie ends with a force sufficient to displace the crib ballast bodily beyond said tie ends into said free space, and collecting the displaced ballast in said free space.

21. Method of cleaning the crib ballast of a track bed which also has shoulder ballast located outwardly of the crib, comprising removing said shoulder ballast from said bed to provide free space beyond the tie ends, forming a pressurized fluid at superatmospheric pressure, projecting a stream of said pressurized fluid at a high velocity against said shoulder ballast with a force sufficient to dislodge dirt therefrom, projecting a stream of said pressurized fluid against the crib ballast with a force sufficient to dislodge dirt from the crib ballast, directing said stream outwardly toward the tie ends with a force sufficient to displace the crib ballast and dirt bodily beyond said tie ends into said free space, collecting said crib ballast and dirt in said free space, mixing said crib ballast and dirt with the shoulder ballast and dirt, and separating the dirt from the mixed crib and shoulder ballast.

22. Method of cleaning the crib and shoulder ballast of a track bed having a shoulder and a crib, said track bed supporting a track having transverse ties and longitudinal rails, comprising removing the shoulder ballast to provide free space beyond a tie end, projecting a fluid jet against the outer crib ballast, located in the outer crib space situated between the ties outwardly of the rails, with a force sufficient to move said outer crib ballast outwardly to said free space beyond the tie end, and subsequently projecting a fluid jet against the inner crib ballast, located in the inner crib space intermediate both said ties and said rails, with a force sufficient to move said inner crib ballast outwardly beneath a rail and through the outer crib space to said free space beyond the tie end.

References Cited in the file of this patent

UNITED STATES PATENTS 263,652    Butler _____ Aug. 29, 1882

(Other references on following page)

UNITED STATES PATENTS

| | | |
|---|---|---|
| 533,929 | Taylor | Feb. 12, 1895 |
| 805,517 | Bannon et al. | Nov. 28, 1905 |
| 1,329,554 | Sims | Feb. 3, 1920 |
| 1,381,132 | Mott | June 14, 1921 |
| 1,576,093 | Cooke | Mar. 9, 1926 |
| 1,594,709 | Bubb | Aug. 3, 1926 |
| 1,770,552 | Robb | July 15, 1930 |
| 2,030,553 | Tiley | Feb. 11, 1936 |
| 2,300,017 | Shaffer | Oct. 27, 1942 |
| 2,309,712 | Philbrick | Feb. 2, 1943 |
| 2,632,923 | Nisbet | Mar. 31, 1953 |